(12) United States Patent
Connolly et al.

(10) Patent No.: US 8,650,191 B2
(45) Date of Patent: Feb. 11, 2014

(54) SEARCH ENGINE OPTIMIZATION ASSISTANT

(75) Inventors: Sean M. Connolly, Wakefield, MA (US); Whitney A. Pegden, Boston, MA (US); Colin B. Roald, Somerville, MA (US); Joshua Jordan, Somerville, MA (US); Utkarsh Prateek, Woburn, MA (US); David A. Yuknat, Dover, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 0 days.

(21) Appl. No.: 12/861,222

(22) Filed: Aug. 23, 2010

(65) Prior Publication Data
US 2012/0047120 A1 Feb. 23, 2012

(51) Int. Cl.
G06F 17/30 (2006.01)
(52) U.S. Cl.
USPC .......................................... 707/736; 707/758

(58) Field of Classification Search
USPC .................................................. 707/736, 758
See application file for complete search history.

(56) References Cited

U.S. PATENT DOCUMENTS

| | | | |
|---|---|---|---|
| 7,487,094 B1 * | 2/2009 | Konig et al. | 704/270 |
| 2007/0016577 A1 * | 1/2007 | Lasa et al. | 707/5 |
| 2008/0077577 A1 * | 3/2008 | Byrne et al. | 707/5 |
| 2008/0082528 A1 * | 4/2008 | Bonzi et al. | 707/5 |
| 2008/0201348 A1 * | 8/2008 | Edmonds et al. | 707/101 |
| 2009/0037355 A1 * | 2/2009 | Brave et al. | 706/45 |
| 2010/0318507 A1 * | 12/2010 | Grant et al. | 707/706 |

* cited by examiner

*Primary Examiner* — Son T Hoang
(74) *Attorney, Agent, or Firm* — Jessica Costa

(57) ABSTRACT

Website optimization methods and tools for optimizing visibility of a website to Internet search engines include evaluation of a against one or more optimization tests based on one or more search terms. A report is generated along with tools that guide and prompt the user for user input that is used by the tools to directly edit content of the website to improve the visibility of the website to Internet search engines.

20 Claims, 21 Drawing Sheets

FIG. 1

| apple pie | Search |

About 9,190,000 results (0.31 seconds)                    Advanced search

Sponsored links

Apple Pie ☆
Apple pie is a part of almost all American Traditions. It has, in a way, become a tradition itself. It is what brings families around the table for dessert ...
www.myhomecooking.net/apple-pie/ - Cached - Similar

Apple Pie
Search Exclusive Recipes
From Betty Crocker®
Official Site.
www.BettyCrocker.com

Apple Pie - Wikipedia, the free encyclopedia ☆
An apple pie is a fruit pie (or tart) in which the principal filling ingredient is apples. It is sometimes served with whipped cream or ice cream on top ...
en.wikipedia.org/wiki/Apple_pie - Cached - Similar

Pillsbury® Dinner Recipes
Ease into Your Fall Routine
with Quick & Easy Dinner
Tools & Tips!
www.Pillsbury.com/BacktoSchool See your ad here.

Grandma Opie's Apple Pie Recipe - Allrecipes.com ☆
★★★★★ 1,023 reviews - Prep time: 30 mins - Cook time: 1hr
Aug 5, 2010... Tired of ordinary old apple pie? Well this fabulous recipe adds a delicious twist to the apply classic. Slice, unadorned apples are mounded...
allrecipes.com/recipe/grandma-opies-apple-pie/ - Cached Images for apple pie -Report Images

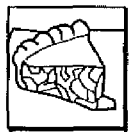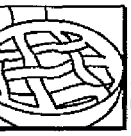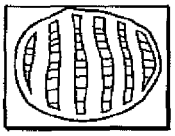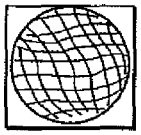

Apple Pie Recipe ☆
basic apple pie recipe you can make with your children.
www. dltk-teach.com/alphabuddies/.../apple_pie_recipe.htm - Cached - Similar

Apple Pie Recipes For Hot Pies, Spice Mix, Topping, Crust, & Filling ☆
Welcome to our website, Apple Pie. Our website features an ever growing database of apple pie recipes, making it one of the largest currently online.
www.applepie_.org/ - Cached - Similar

**Apple Pie Recipe With Picture - Joyofbaking.com *Tested Recipe*** ☆
The Apple Pie, with its two rounds of pastry enclosing slices of cinnamon sugared apples, is a favorite dessert in North America.
www.joyofbaking.com/ApplePie.html - Cached - Similar Traditional Apple Pie Recipe :: Food Network ☆
★★★★★ 93 reviews - Prep time: 20 mins - Cook time: 50 mins
Food Network invites you to try this Traditional Apple Pie recipe from Tyler's Ultimate.
www.foodnetwork.com/recipes/tylers...apple-pie.../index.html - Cached - Similar

Apple Pie Recipe at Epicurious.com ☆
Prep time: 1hr - Cook time: 1 hr
Apple Pie, Gourmet| September 2002. Recipe by Melissa Roberts-Matar...Bake pie on hot baking sheet 20 minutes. Reduce oven temperature to 375° F and ...
www.epicurious.com/recipes/.../Apple-pie-107033 - Cached - Add to Google 300c

[Icon] SEO Analyzer

Welcome

Welcome to the SEO tool/product

SEO is important because it helps you get found...

It helps drive more traffic to your website

Before we get started you have to configure your tool, then you'll be able to view a report and use our tools to optimize your site.

If at any point you get lost, click help.

oh yeah||

SEO 101
What's it all about?

Links off to a webpage that discusses, content, search terms, meta tags, page names, etc.

? Help

Cancel    Get Started ▷ — 305

FIG. 3C

[Icon] SEO Analyzer                                                                                ⊗

SEO Set up
To get you up and running you need to choose some search terms <define "search terms"> We'll use these search terms to help you optimize your site..
Enter your company name (if applicable)

[ Jazz Guitar ] — 306

Type in a word or phrase that describes your business or website.

[ Jazz Guitar ] — 307

Optimize for Location
See what people are searching for where you live and work.

[ UNITED STATES ▶ ] — 308
[ Choose State (optional) ▶ ] — 309

All about Search Terms
Think like your customers.. what are they typing into the search engines? Optimize for that.
 *Product specifics
 *Location/Geography
 *more..
        <MORE EXPLANATORY CONTENT>

(?) Help                                    ◁ Back      Continue ▷

Icon SEO Analyzer

Search Term Suggestions
Refer to the list on the right.

Type in the terms you want to use then click finish.
The terms you choose will be used for analysis.

Tip: We recommend you use 3-6 search terms.

- Jazz Guitar Chords
- Jazz Chords
- Jazz Bass Guitar
- Enter Search Term
- Enter Search Term

— 310

Top Searches | Rising Searches

Top Searches related to "jazz guitar"
Time range: Last 90 days

- Jazz Guitar Chords
- Jazz Chords
- Jazz Bass Guitar
- Jazz Bass
- Bass guitar
- Jazz tabs guitar
- Jazz tabs
- Jazz guitar tab
- Best jazz guitar
- Jazz guitar

— 311

+Google       Gadgets powered by Google

Search again:
[ Jazz Guitar Chords ] [ > ]

( Back )    ( Finished )  — 312

? Help

SEO Analyzer — 313

Current score is XX% based on the following search terms:
search term 1, search term 2, search term 3, search term 4, search term 5, search term 6

Edit Search Terms

315 — View Report
Talk about what's included in the report.

[Do this First]

316 — Quick Fixers
Tools that walk you through some quick fixes to help optimize your site. Here's where you enter Meta tag info (for those looking for the old "Keyword" dialog -after upgrade)

These fixes should only take a few minutes.

317 — Improve Your Content
The best way to optimize your website is to write great content. We'll help you.

Help    Close

SEO Optimization

SEO Menu > Quick Fixers: About Your Site                     300h

About Your Site   Also know as "Meta Data", Search Engines will look for these
Images                special tags in your code.
Pages 323 — Website Name
324a — Explanation... The website name tells users and search engines what the website is about and is used by search engines in ranking the web page. The website name should include the company name and should be limited to only a few words.

325a — [Dave's Vintago Bass Shop]  ****  326a

323 — Company Message:
324 — Explanation....

325 — [We love old wood!]  ****  326

323 — Keywords
324 — These are different than search terms, but not really.
       Explain this ....

325 — [<auto populate w/ search terms provided during setup>]  ****  326

◁ Back    Next ▷

⊚ Help

Icon SEO Analyzer

SEO Menu > SEO Report

Site Structure - General
Site Structure - Pages
Site Structure - images

Content - General
Content - Search Terms
Next Steps

---

Content: Search Terms
How your website performs against the search terms provided.

Uses Search Terms?
Consectetuer adipiscing elit, sod diam nonummy nibh euismod tincidut ut laoroot delore magna aliquam erat volutpat.

| Keywork | Strength | Best Page |
|---|---|---|
| 353a — Search Term 1 | X% — 354a | Home |
| 353b — Search Term 2 | X% — 354b | About Us |
| 353c — Search Term 3 | X% — 354c | Contact Us — 355 |
| Search Term 4 | X% | Our Products |
| Search Term 5 | X% | Our Products |

Search Term Ratio — 356
Consectetuer adipiscing elit, sed diam nonummy nibh euismod tincidunt ut laoroot delore magna aliquam erat volutpat.

? Help   🖨 Print Report

◁ Back     Done — 357

SEO Analyzer

Optimize your content in Site Builder.....

Tell the customer what they have to do. Click Optimize Content, go to Site Builder, use the toolbar, and optimize content for the search terms.

I'm sure there's going to be at least two paragraphs for this so here's some more text.

Your current content score is XX%

The best way to improve your search results is to have great content.

- Make sure you have enough content

- Make sure you incorporate search terms

- content to Search Term ratio shouldn't be too high.

- Use normal language.

- It's OK to focus on only one page

- Have at least one page optimized for a search term.

- Don't just stick search terms all over the place - this is bad for content and rankings.

- Make your content unique.

Help   Cancel   Optimize Content > — 358

FIG. 30

SEARCH ENGINE OPTIMIZATION ASSISTANT

BACKGROUND OF THE INVENTION

The present invention relates generally to search engine optimization, and more particularly to tools and methods for improving a website for search engine visibility.

The Internet is being increasingly used to relay information, advertise, and engage in e-commerce. With the increase in web site building and publication tools, many users who might not otherwise have the time or skill to create their own websites or the money to hire an outside consultant are now publishing to the World Wide Web. For example, such tools often provide web page templates that allow a user to enter personalized content and select web page layout, styles, fonts, colors, etc., and then immediately publish the completed pages to the Internet.

A search engine is typically used by Internet users to find web pages relevant to user input search terms. In a typical search engine, a user is presented with a web page which prompts the user for one or more search terms. Upon entry of the search term(s), the search engine scans its index of the World Wide Web to locate web pages that may have some relevancy to the input search terms. FIG. 1 shows an example search engine results page. As shown, a search engine results page typically includes a section containing paid search results and a section including organic search results. Paid search results are advertisements paid for by the advertiser and therefore may or may not be closely relevant to the search terms. Organic search results are results that are relevant in some manner to the input search terms. Search engines typically rank the organic search results by relevance of the content of the page to the search term such that those pages which have the closest relevance to the input search terms appear higher up in the search results than those less relevant.

At the present number of websites accessible over the Internet (current estimates as of early 2010 are in the hundreds of millions of websites), and as the number of web sites and web pages increases, the importance of being visible in the organic search results within the first few search results pages cannot be underestimated.

Search Engine Optimization (SEO) is the process of optimizing a website so that it appears high up in search engine results pages. Search engines crawl the Internet, ranking websites according to content of the websites. Many websites include metadata that does not get displayed as content of the website, but is included in the HTML (or other browser-enabled) source code and describes content of the website and keywords to enable search engines to identify the website as relevant to certain search terms. In order to get found online, it is important for website designers to insert relevant and frequently searched-for search terms in the metadata of the pages of the website.

SEO is a task that the website administrator normally has to do manually. The website administrator can be an individual who owns or maintains the website, or may be an outside consultant whose business it is to design, create and maintain websites. Because search engine optimization involves complex analytics and an understanding and ability to correspond search terms to a web page, SEO has heretofore typically been managed by professional web site developers or other individuals who have developed the skill set needed to manage the website SEO.

Many small businesses and other individuals do not have the time, knowledge, or money to optimize their websites for Search Engine Optimization (SEO). These customers need to be able to rank better in Search Engine Results Pages (SERPs) in order to be competitive and drive more business to their websites by getting found online.

Existing solutions to this problem are too expensive, too complicated, and require SEO knowledge that many website owners do not have. All known solutions involve a "Do It For You" approach. In one approach, a consultant analyzes and optimizes the website for the website owner. In another approach, tools are provided to the website owner/administrator, to perform a simple analysis of a website. However, these tools do not automatically fix the items identified by the analysis, or guide the user through ways to change the website to improve search engine visibility, or provide realtime visibility into how updates to the website affect the visibility of the site to search engines.

SUMMARY OF THE INVENTION

In an embodiment, a method for assisting a user in optimizing a website for search engine visibility includes having access to a website, receiving one or more search terms and adding them to a list of search terms on which an analysis of the website will be based, determining and displaying one or more suggested search terms that may be related to the received search terms, performing an analysis of the website based on the list of search terms and the content of the website, the analysis comprising testing a plurality of different aspects of the website according to criteria associated with testing the corresponding aspect of the website, and providing access to a report, the report displayable to the user and presenting at least one indicator associated with one or more tested aspects of the website that indicates how well the one or more tested aspects of the website scores in terms of optimization for visibility to search engines and at least one control which, when activated by the user, allows the user to enter input associated with one or more of the tested aspects of the website, wherein the user's entry of the input causes update to website content associated with the one or more tested aspects of the website, wherein the report includes one or more explanations to assist the user in entering user input that will result in an improvement to the individual score of the associated tested aspect of the website.

In an embodiment, non-transitory computer readable storage includes computer readable program instructions which, when executed by one or more processors, perform the method of the previous paragraph.

In an embodiment, a website optimization apparatus for optimizing visibility of a website to internet search engines includes one or more processors, and non-transitory computer readable storage storing program instructions which, when executed by the one or more processors, accesses one or more pages of a website, automatically evaluates the accessed one or more pages against one or more optimization tests based on one or more search terms, and provides one or more tools that guide and prompt the user for user input that is used by the analyzer to directly edit content of the website to improve the visibility of the website to internet search engines.

Additional embodiments include writing content tools and search term assistant tools.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a screen shot of an example search engine results page shown to a user upon running a search in a search engine;

DETAILED DESCRIPTION

Figure 2:
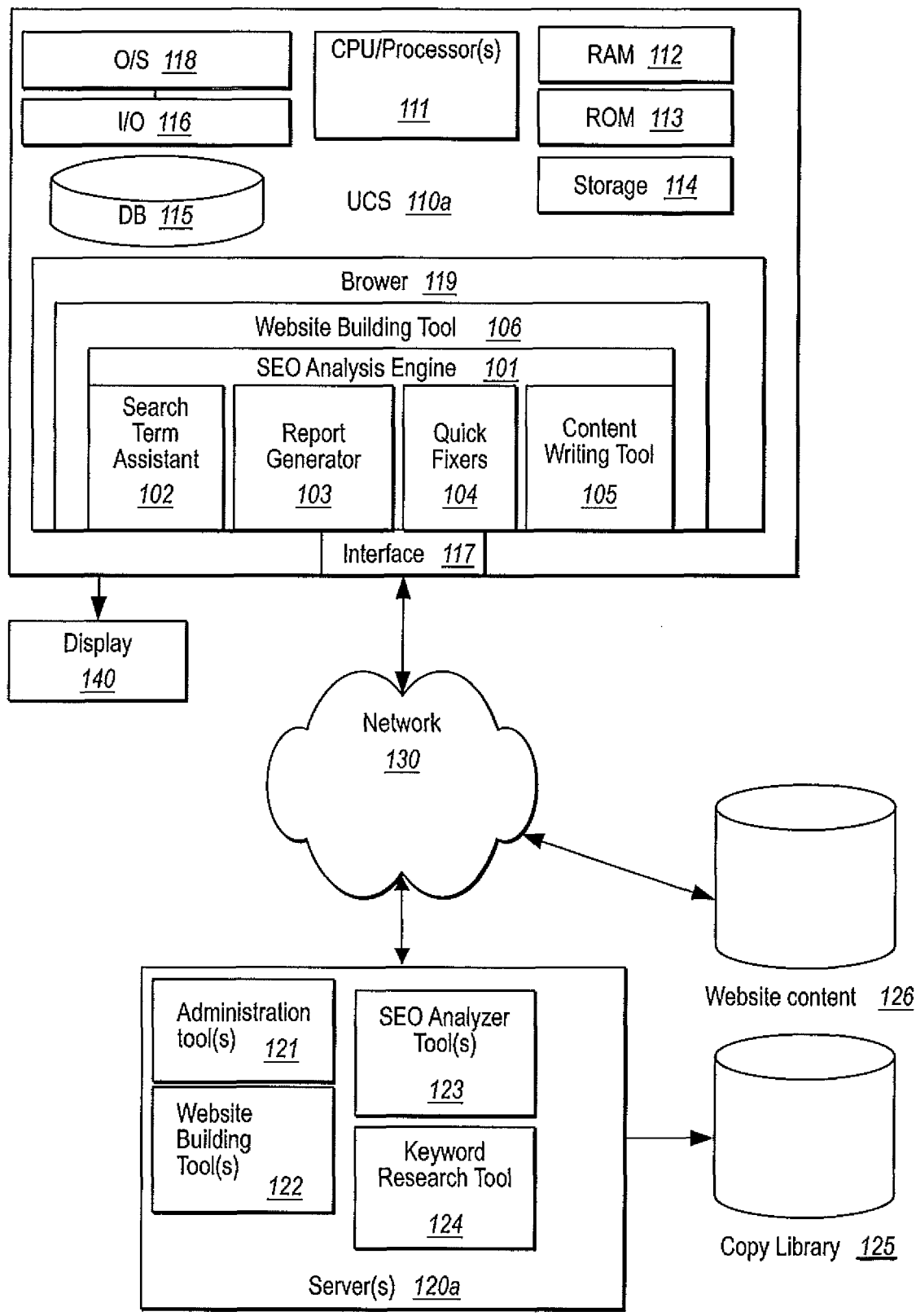
FIG. 2 is a block diagram of an exemplary computing environment in which the invention may operate
Figure 3A:
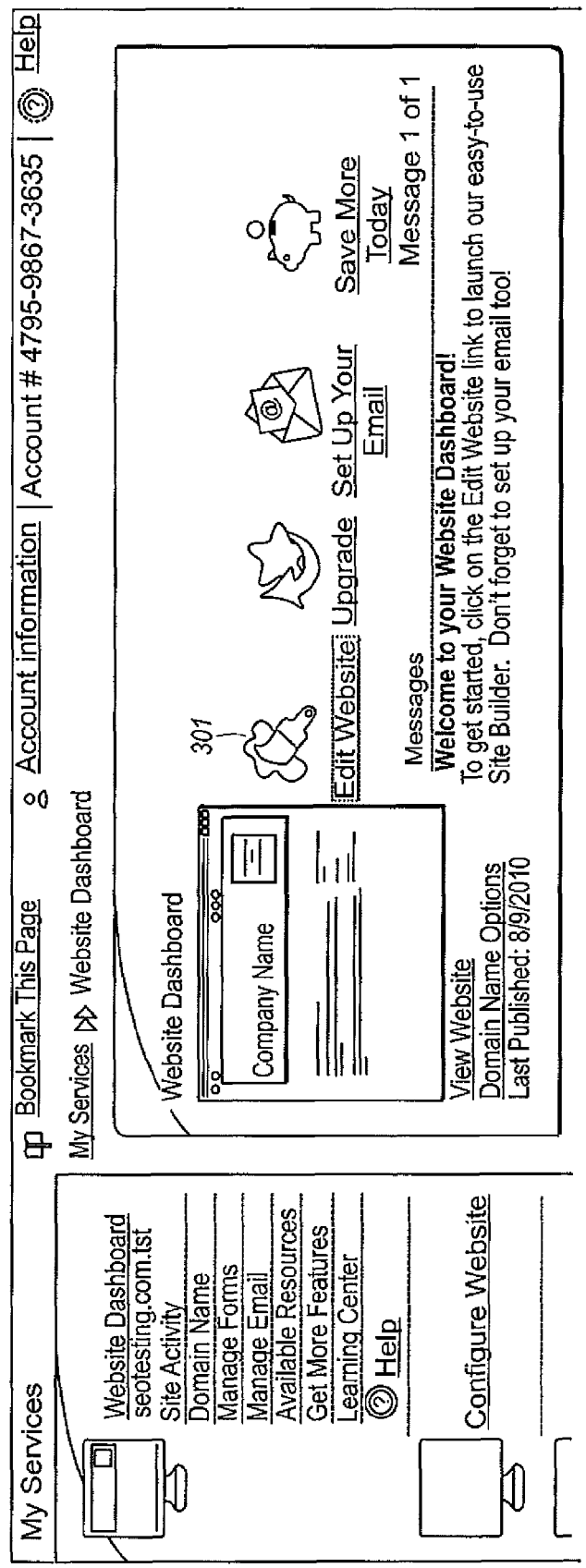
FIGS. 3A-3R illustrate a number of web pages that may be displayed to a user in an exemplary flow through the SEO analysis tool.
Figure 3B:
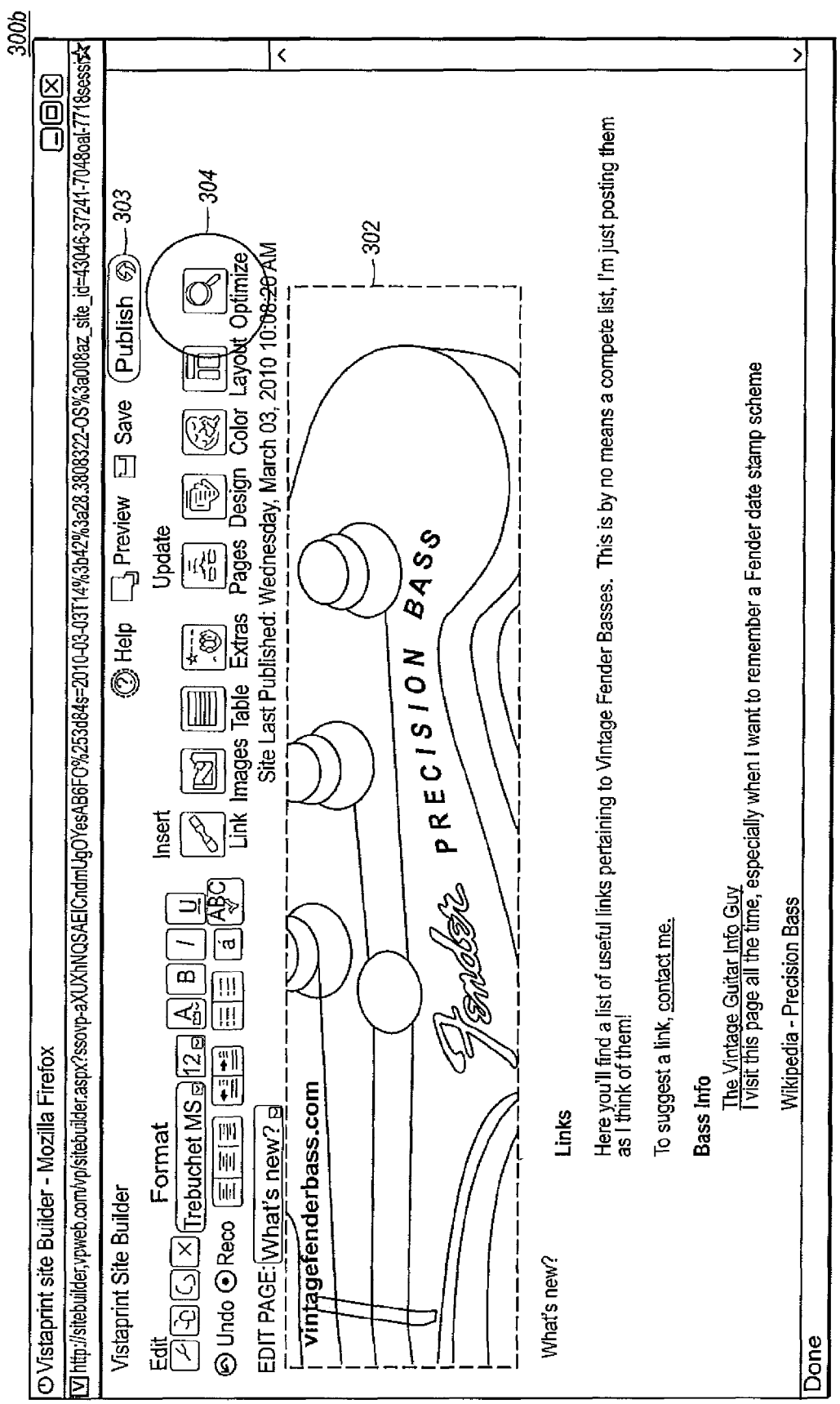
Figure 3G:
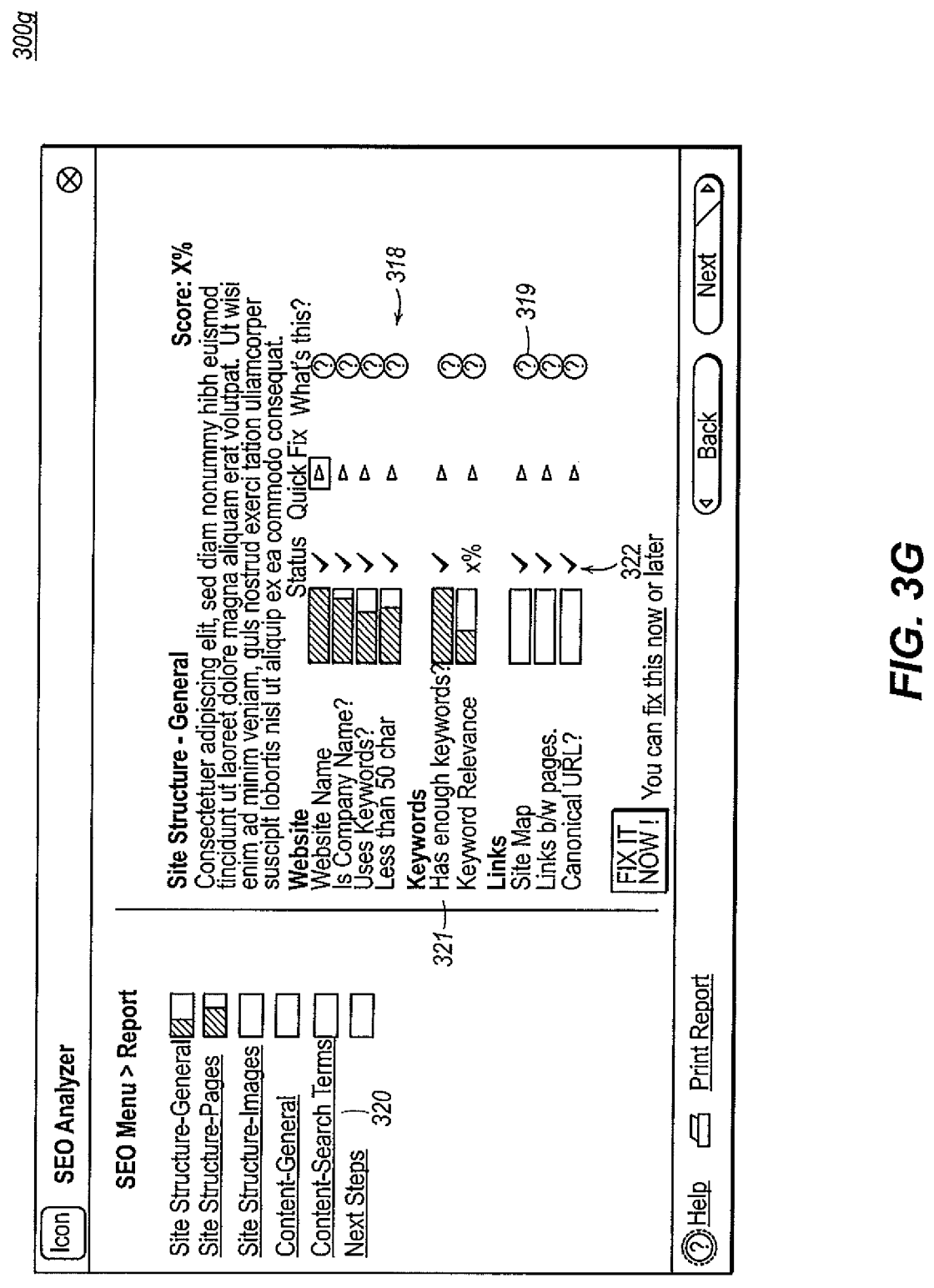
Figure 3I:
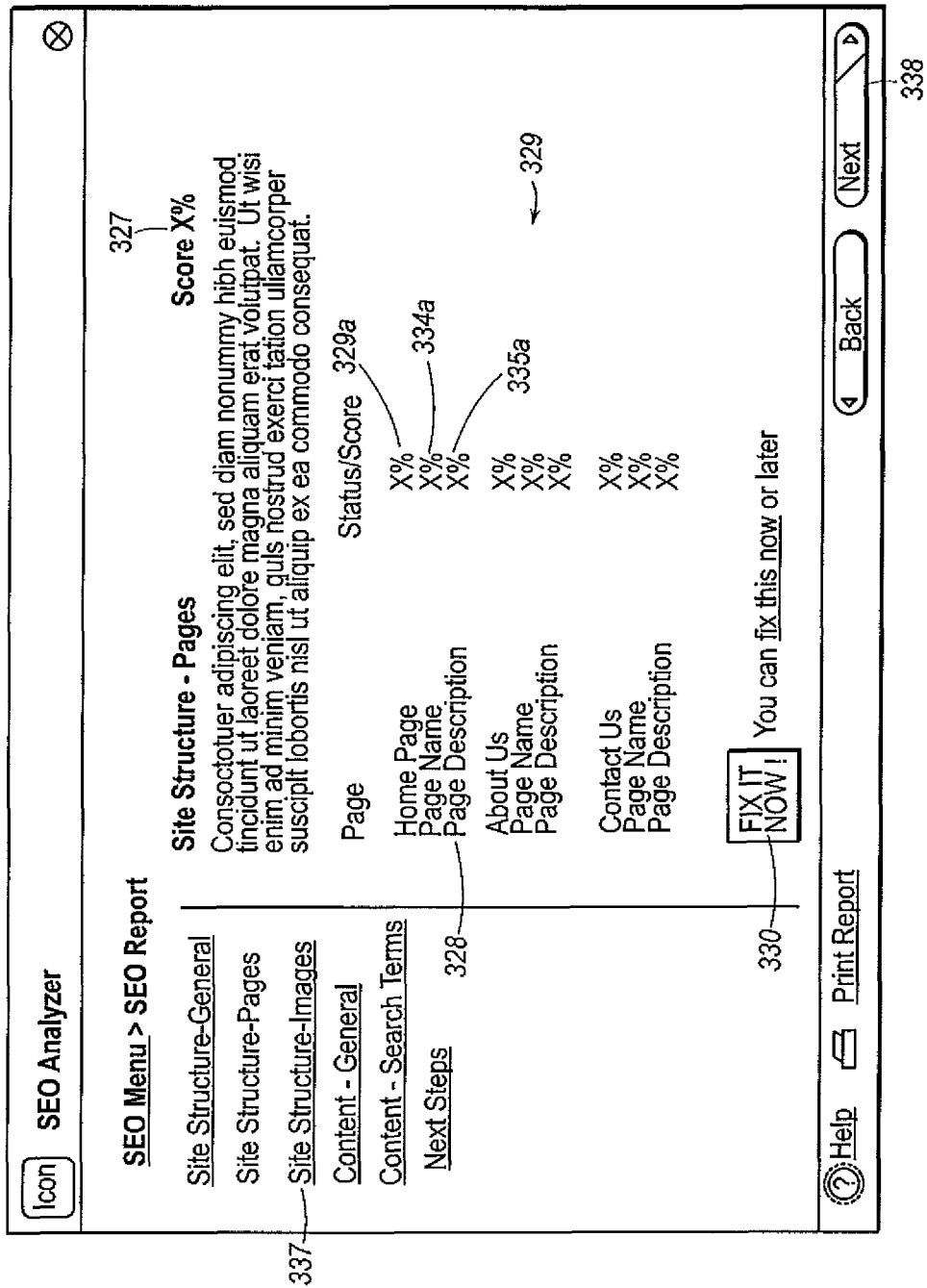
Figure 3J:
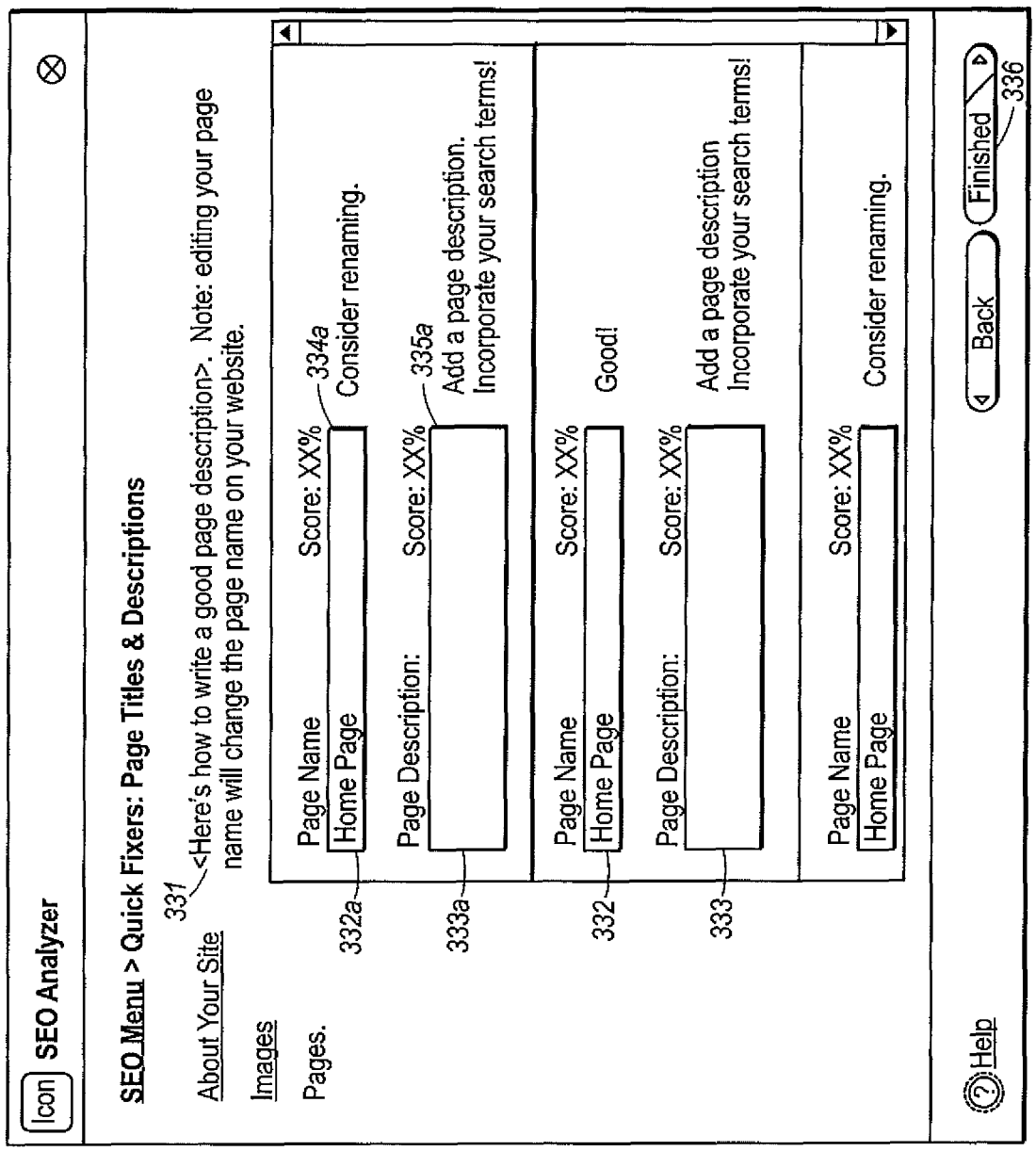
Figure 3K:
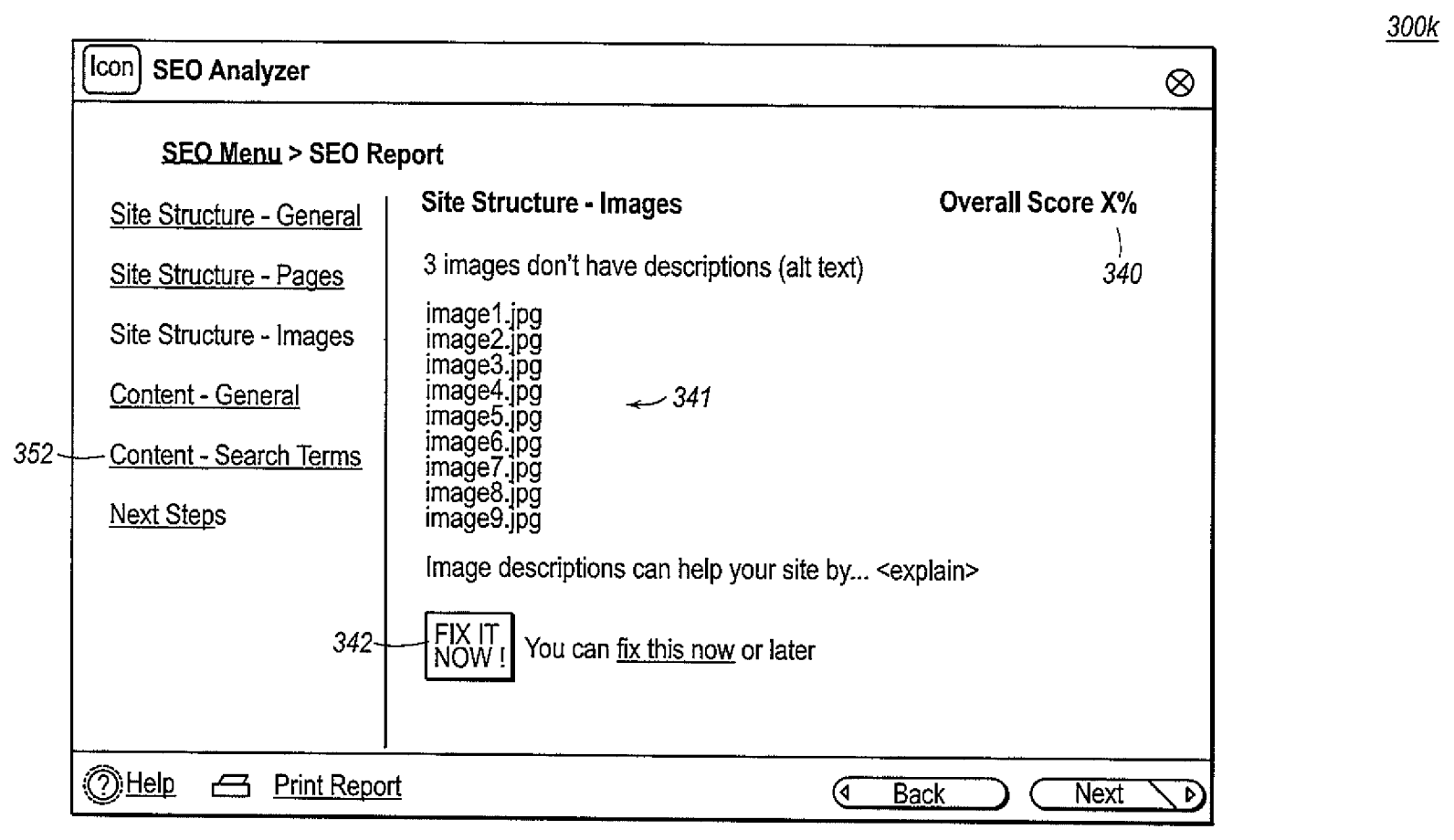
Figure 3L:
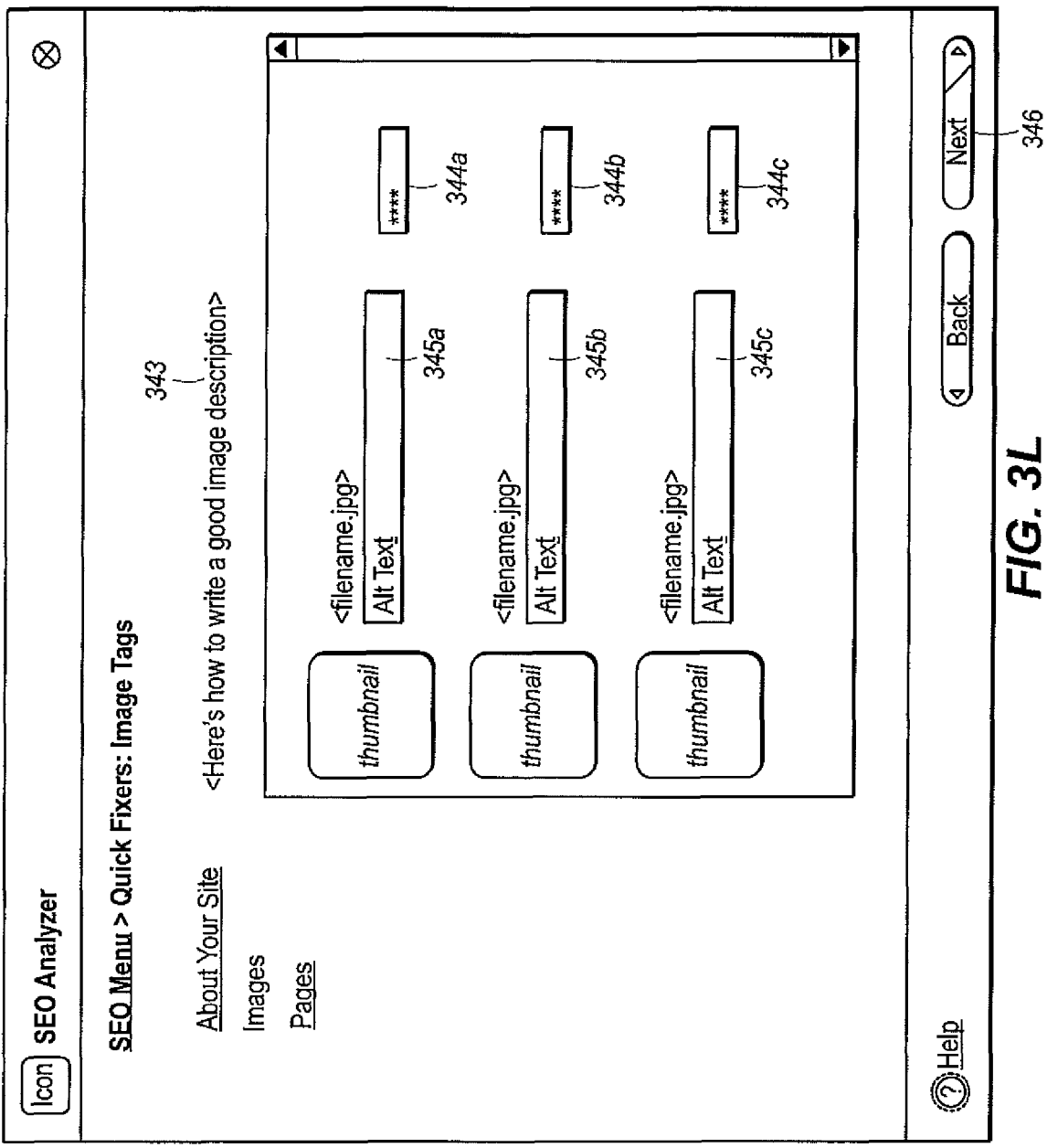
Figure 3M:
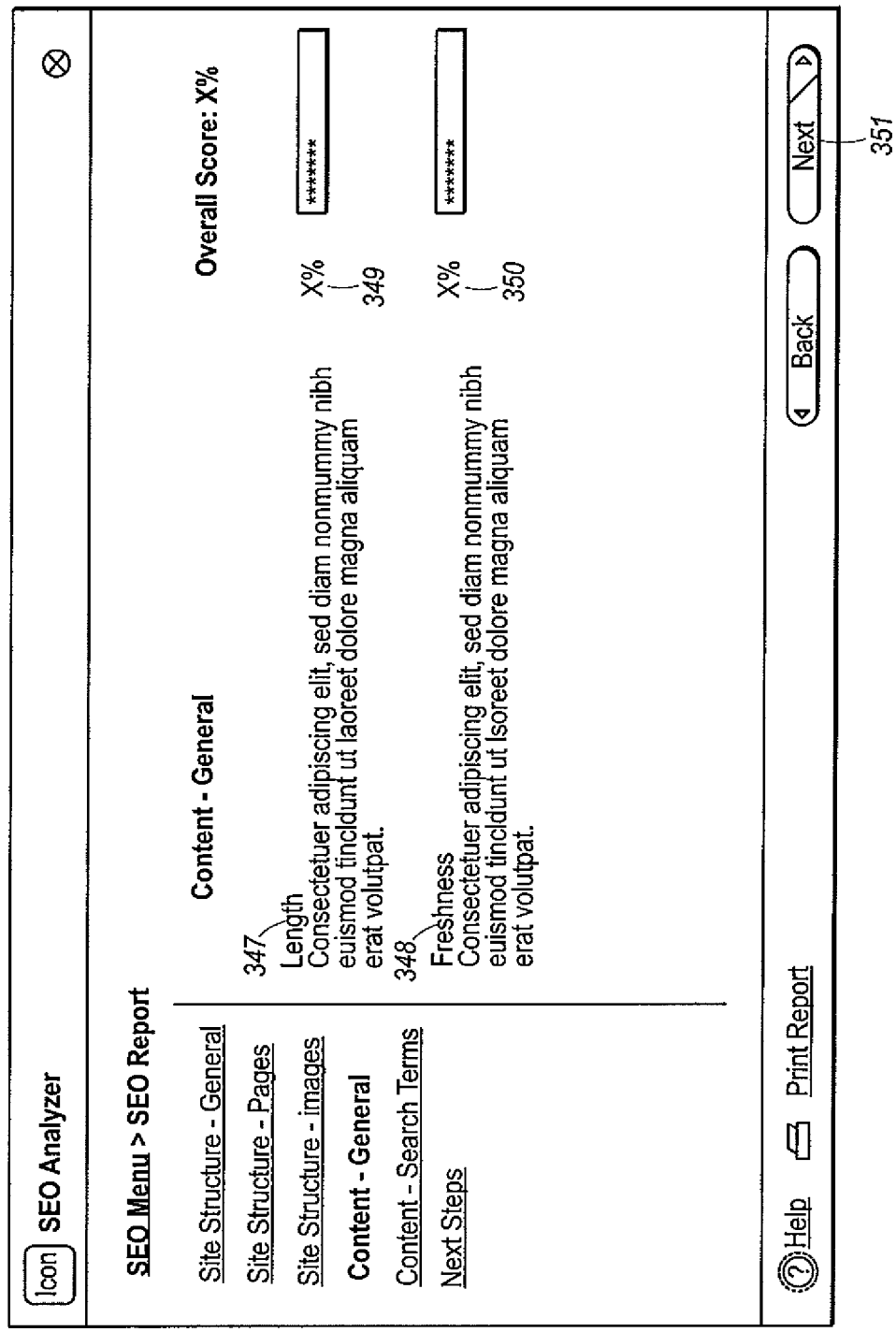
Figure 3P:
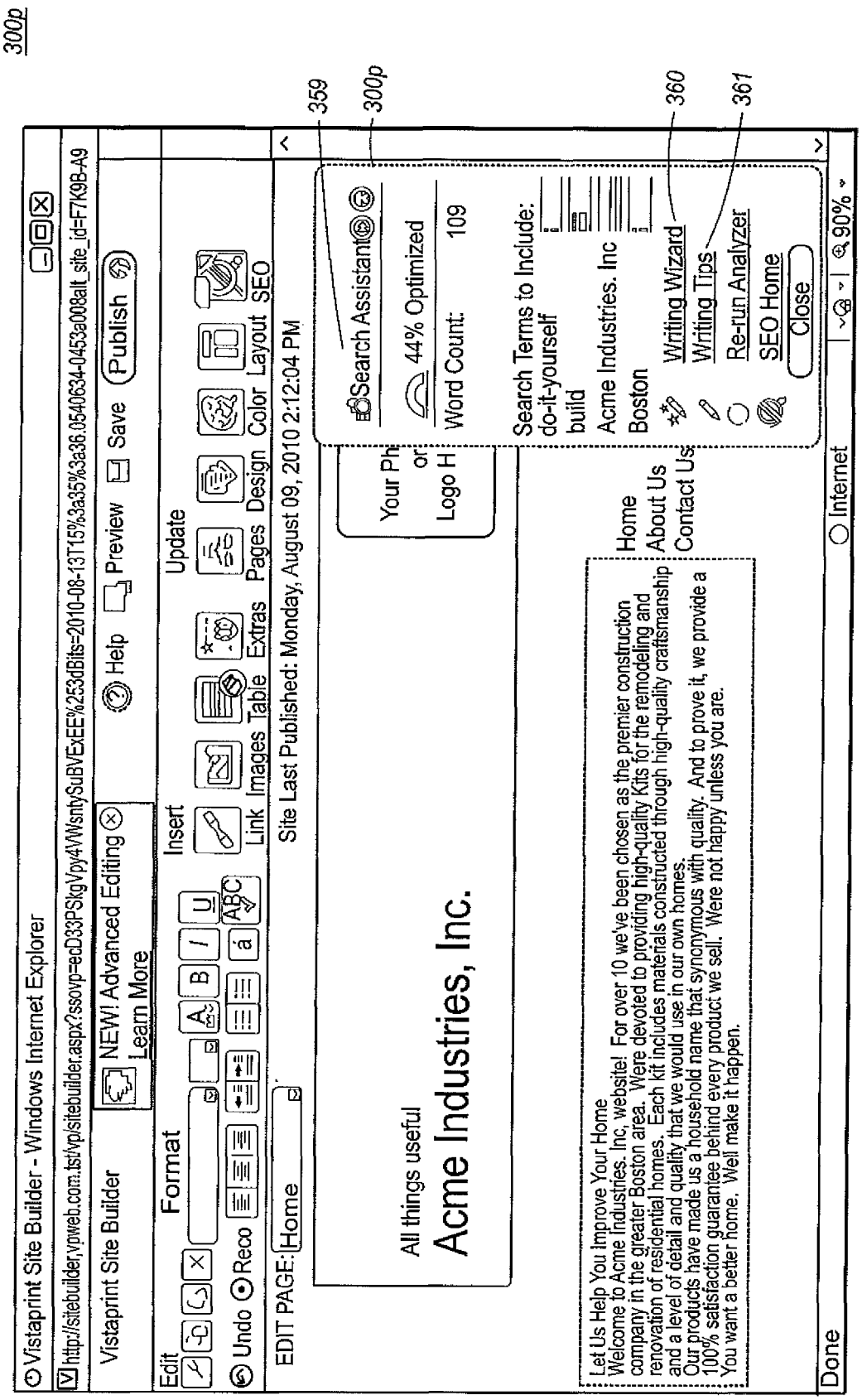
Figure 3Q:
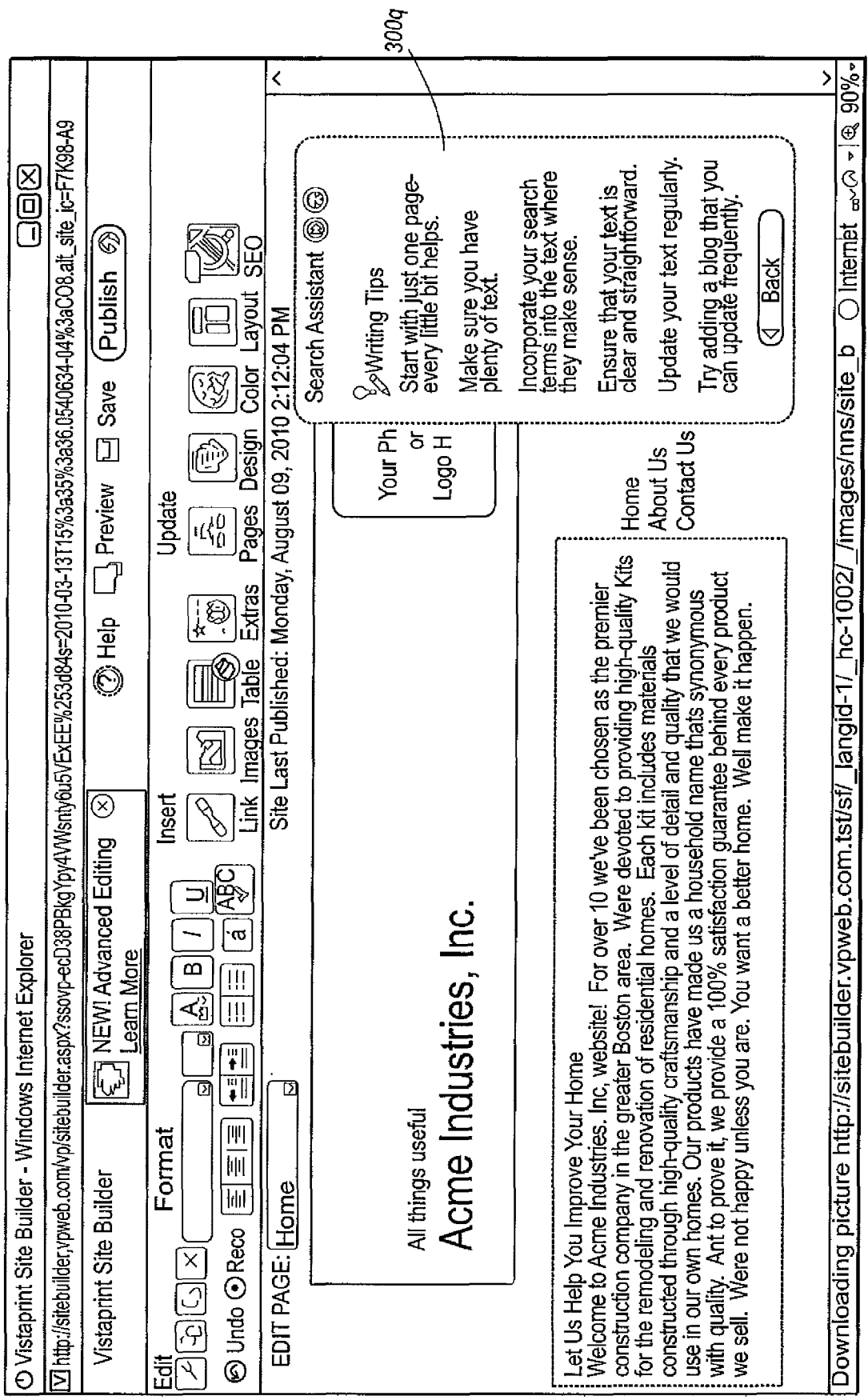
Figure 3R:
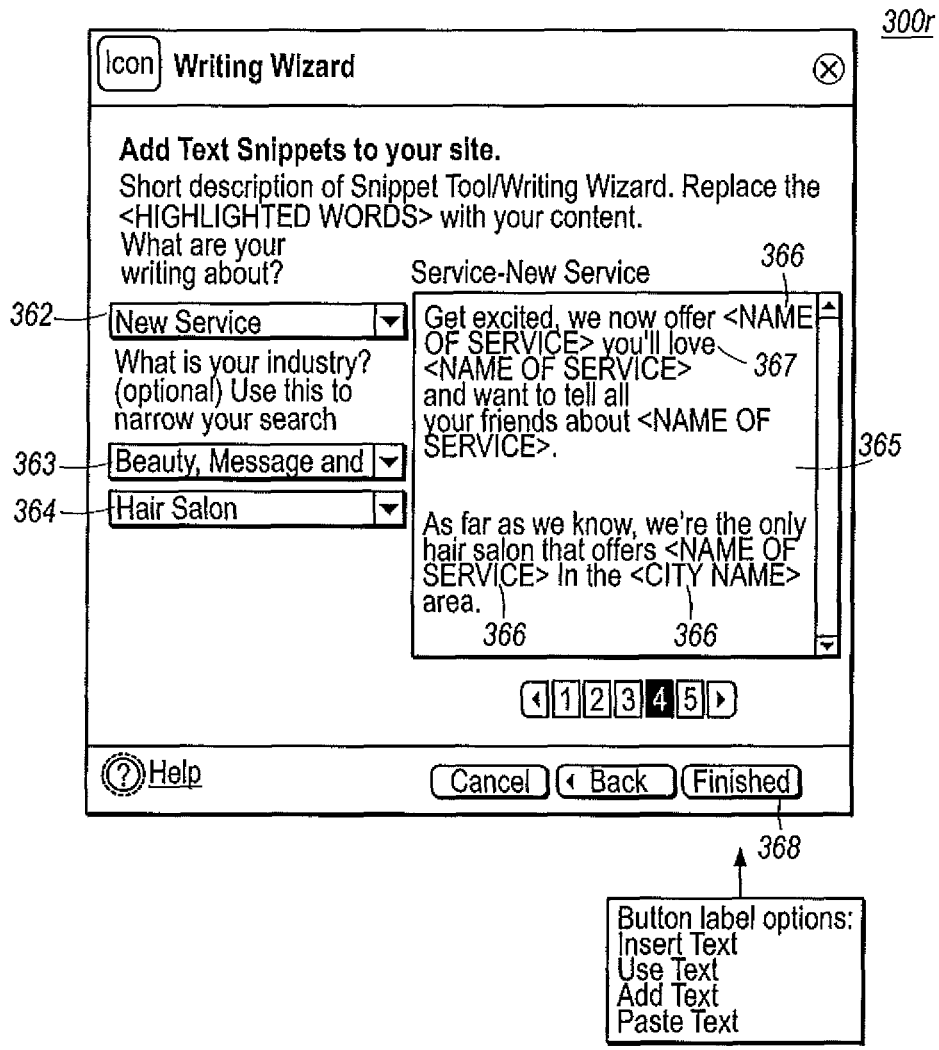
Figure 4:
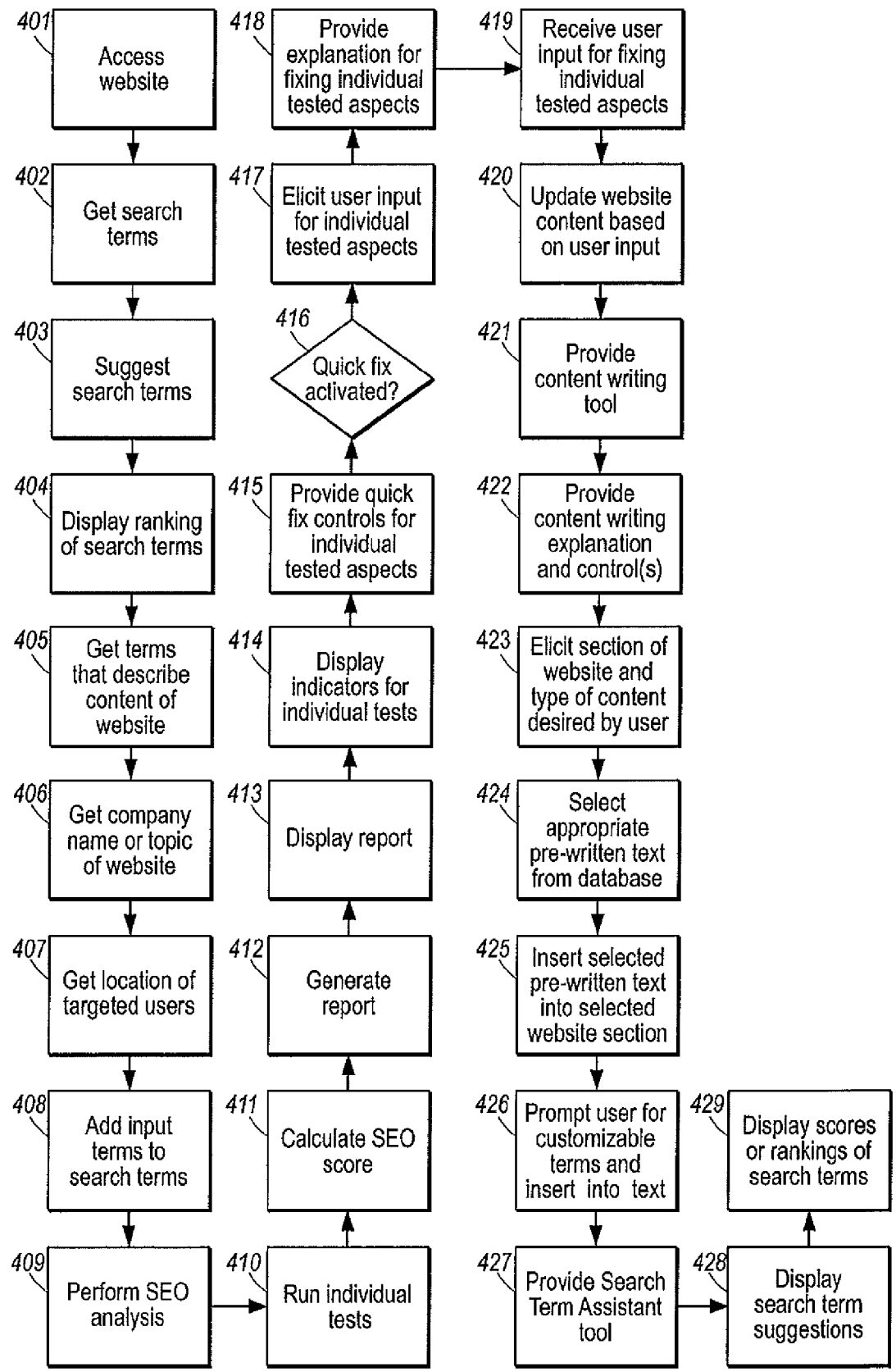
FIG. 4 is a flowchart illustrating an exemplary flow through the SEO analysis tool.

FIGS. 2-4 and the following description detail a web site Search Engine Optimization Assistant tool with easy-to-use functionality that provides guidance, information, and assistance for optimizing a website in order to increase the likelihood that the website is indexed competitively by search engines in the Search Engine Results Pages (SERPS). The process of running/viewing the site analysis, making updates, and optimizing content includes automated processes to provide simple-to-use functionality for optimizing a website for SERPS.

Features include a website analysis tool, a search term assistant tool, quick fixer tools for fixing specific areas of the website to improve optimization of the website, a content writing tool, and individual indicators indicating the status (optimized or unoptimized or a degree of optimization) of specific areas of the website that are tested for SEO.

FIG. 2 is a block diagram of an exemplary embodiment of a computing environment in which the SEO analyzer tool operates. As illustrated, website environment 100 may include a plurality of client systems 110a-c. Internet users can use systems 110a-c to access websites hosted by servers 120a-b over a network 130, such as the Internet. Systems 110a-c may also evaluate websites hosted on servers 120a-b using an SEO Analysis Engine 115 and make changes to the websites to improve the visibility of the websites to search engines.

Systems 110a-c may include any type of processor-based system on which processes and methods consistent with the disclosed embodiments may be implemented. For example, as illustrated in FIG. 2, system 110a may include one or more hardware and/or software components configured to execute software programs. System 110a may include one or more hardware components such as a central processing unit(s) (CPU) 111, random access memory (RAM) module(s) 112, read-only memory (ROM) module(s) 113, non-transitory computer readable storage 114, database(s) 115, one or more input/output (I/O) devices 116, and interface(s) 117. System 110a may include one or more software components such as a computer-readable medium including computer-executable instructions for performing methods consistent with certain disclosed embodiments. One or more of the hardware components listed above may be implemented using software. For example, storage 114 may include a software partition associated with one or more other hardware components of system 110. System 110 may include additional, fewer, and/or different components than those listed above, as the components listed above are exemplary only and not intended to be limiting.

CPU(s) 111 may include one or more processors, each configured to execute instructions and process data to perform one or more functions associated with system 110. As illustrated in FIG. 2, CPU(s) 111 may be communicatively coupled to RAM 112, ROM 113, storage 114, database 115, I/O devices 116, and interface 117. CPU 111 may be configured to execute sequences of computer program instructions to perform various processes, which will be described in detail below. The computer program instructions may be loaded into RAM for execution by CPU 111.

RAM 112 and ROM 113 may each include one or more devices for storing information associated with an operation of system 110a and CPU 111. RAM 112 may include a memory device for storing data associated with one or more operations of CPU 111. For example, ROM 113 may load instructions into RAM 112 for execution by CPU 111. ROM 113 may include a memory device configured to access and store information associated with system 110a, including information for identifying, initializing, and monitoring the operation of one or more components and subsystems of system 110a.

Storage 114 may include any type of mass storage device configured to store information that CPU 111 may need to perform processes consistent with the disclosed embodiments. For example, storage 114 may include one or more magnetic and/or optical disk devices, such as hard drives, CD-ROMS, DVD-ROMs, or any other type of mass media device.

Database 115 may include one or more software and/or hardware components that cooperate to store, organize, sort, filter, and/or arrange data used by system 110a and CPU 111. For example, database 115 may include historical data from evaluating websites, such as previous evaluation scores, recommended improvements, timelines for making the improvements, and customer surveys. CPU 111 may access the information stored in database 115 for comparing the past recommended website improvements to the current state of a website.

I/O devices 116 may include one or more components configured to communicate information with a user associated with system 110a. For example, I/O devices may include a console with an integrated keyboard and mouse to allow a user to input parameters associated with system 110. I/O devices 116 may also include a display, such as a monitor, including a graphical user interface (GUI) for outputting information. I/O devices 116 may also include peripheral devices such as, for example, a printer for printing information associated with system 110, a user-accessible disk drive (e.g., a USB port, a floppy, CD-ROM, or DVD-ROM drive, etc.) to allow a user to input data stored on a portable media device, a microphone, a speaker system, or any other suitable type of interface device.

The results of received data may be provided as output from system 110a to I/O device 116 for printed display, viewing, and/or further communication to other system devices. Such output may include, for example, evaluation reports, recommended changes to a website, required changes to a website, timelines for improving a website, and other data consistent with evaluating websites. Output from system 110a can also be provided to database 115 and to other systems 110b-c and web hosts 120a-b to track website evaluations. Using this information, websites may be evaluated and updated in a consistent manner, allowing a company to provide information on products and services to a customer in a consistent, user-friendly manner.

Interface 117 may include one or more components configured to transmit and receive data via a communication network, such as the Internet 130, a local area network, a workstation peer-to-peer network, a direct link network, a wireless network, or any other suitable communication platform. In this manner, systems 110a-c and web hosts 120a-b may communicate through the use of a network architecture.

The network architecture may include, alone or in any suitable combination, a telephone-based network (such as a PBX or POTS), a local area network (LAN), a wide area network (WAN), a dedicated intranet, and/or the Internet 130. Further, the network architecture may include any suitable combination of wired and/or wireless components and systems. For example, interface 117 may include one or more modulators, demodulators, multiplexers, demultiplexers, network communication devices, wireless devices, antennas, modems, and any other type of device configured to enable data communication via a communication network.

A browser 119 executes in a system 110*a*. A website owner or administrator (or other user with authorization to modify a website) may use the browser 119 of the system 110*a* to access the website they desire to optimize for search engine visibility. In this embodiment, system 110*a* may be, for example, a personal computer. In this embodiment, a SEO Analysis Engine 101 may be invoked to execute within the user's browser to access, evaluate, and generate recommended and required improvements to a website.

Web host servers 120*a-b* may host one or more websites to systems 110*a-c* over Internet 130. While not shown in FIG. 2, servers 120*a-b* include components similar to the systems 110*a-c* (including CPU(s) 111, RAM 112, ROM 113, storage 114, database(s) 115), input/output device(s) 116, operating system 118, and interface(s) 117, and potentially a display 140 and browser 119 executing on the server. Server 120*a* may also provide one or more website administration tools, for example including a Website Building Tool and an SEO analysis tool. In an embodiment, a user may set up and add/edit/remove content from their website by being authenticated to the website administration tool(s), and then launching the Website Building Tool(s). In an embodiment, the SEO analysis tool is integrated with the Website Building Tool in order to allow the user to optimize the content of the website for search engine visibility and to allow the user and/or SEO analysis tool to directly modify content of the website within the same tool.

Those skilled in the art will appreciate that all or part of systems and methods consistent with the present disclosure may be stored on or read from other non-transitory computer-readable storage. Website environment 100 may include a computer-readable medium having stored thereon machine executable instructions for performing, among other things, the methods disclosed herein. Exemplary computer readable storage may include secondary storage devices, such as hard disks, floppy disks, and CD-ROM; a carrier wave tangibly embodied on a storage device; or other forms of computer-readable memory, such as read-only memory (ROM) 113 or random-access memory (RAM) 112. Such computer-readable storage may be embodied by one or more components of website environment 100, such as systems 110*a-c*, web hosts 120*a-b*, or combinations of these and other components.

Furthermore, one skilled in the art will also realize that the processes illustrated in this description may be implemented in a variety of ways and include multiple other modules, programs, applications, scripts, processes, threads, or code sections that may all functionally interrelate with each other to accomplish the individual tasks described above for each module, script, and daemon. For example, these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed for this purpose.

The described implementation may include a particular network configuration but embodiments of the present disclosure may be implemented in a variety of data communication network environments using software, hardware, or a combination of hardware and software to provide the processing functions.

A Search Engine Optimization (SEO) Analysis engine 101, which may reside on the user system 110 or may be downloaded from a server 120*a-b*, receives or accesses one or more web pages of a website, analyzes the pages, and returns a set of analysis results. The SEO analysis engine 101 is shown as integrated into a Website Building tool 106; however, it could alternatively be implemented as a standalone tool having its inputs, outputs, and internal components loosely coupled to the website being analyzed.

The SEO Analysis Engine 101 is coupled through the server 120*a* to a Copy Library 125 which stores text copy for use as content in websites.

The SEO Analysis Engine 101 is also coupled to, or has integrated therein, a Search Term Assistant 102 which utilizes a keyword research tool 124. The Search Term Assistant 102 is an interactive tool which runs in a user's browser and allows the user to conduct keyword research to choose effective words to optimize their website. The Search Term Assistant 102, discussed in more detail hereinafter, allows a user to input a keyword (i.e., a search term), and optionally select a region such as a country, a state, a city, and then passes the information to the keyword research tool 124, which searches for related search terms that are frequently searched for and corresponding search statistics. The keyword research tool 124 returns the results and the Search Term Assistant 102 displays the related search terms in order of popularity. With this knowledge, the user can then include the identified popular keywords in their meta tags and content, targeting the search terms that Internet users use most frequently.

In an embodiment, the keyword research tool 124 is a separate tool running on a remote server 120*a* and the SEO Analysis Engine 101 includes an Application Program Interface (API) which provides the inputs and controls for interfacing with the remote keyword research tool, and which processes outputs from the remote keyword research tool to provide to the SEO Analysis Engine 101. In an embodiment, the keyword research tool 124 is a remote keyword research tool such as Google Insights. The SEO Analysis Engine 101 includes domain data which populates dropdown menus and includes JavaScript to modify some parameters in the HTML code.

The SEO Analysis Engine 101 also includes a report generator 103, quick fixer tools 104, and a content writing tool 105, all described in more detail hereinafter.

While one example of website evaluating environment is shown and described relative to FIG. 2, it will be understood that the website environment may include any type of environment associated with developing, distributing, evaluating, updating and maintaining websites. Processes and methods consistent with the disclosed embodiments may provide a website evaluation and recommendation tool that reduces the potential for losing customers due to lack of consistency between independent dealer websites and a parent company. As a result, dealer websites may be evaluated and updated, allowing a company to provide information on products and services to a customer in a consistent manner. Exemplary processes and methods will now be described with reference to FIGS. 3A-3R and 4.

FIGS. 3A-3R show a number of exemplary example web pages that may be presented to a user of the SEO Assistant Tool. In an embodiment, the SEO Assistant Tool is integrated into a Website Building Tool which executes in a browser running on the user's computer. FIG. 3A shows an introductory website administration page 300a displayed in a user's browser that is generated by the website building tool. As illustrated, the website administration page includes a link 301 for editing pages of a website. Upon clicking the edit link, a Website Building Tool 300b may be launched in the browser, as illustrated in FIG. 3B. The Website Building Tool is a design application that allows a user to select and edit content for one or more pages of a website. In the exemplary embodiment, the Website Building Tool includes a work area 302 which displays an edit copy of a page of the website. The edit copy is a page of the website that is editable by a user of the Website Building Tool. The edit copy is not published to the Content Server until the user publishes it, in this example by clicking on the "Publish" button 303 in the Website Building Tool. When a user clicks on the "Publish" button 303, the current edit copy is transmitted to the Content Server and is associated with a URL specific to that page. The Content Server will then serve the published page to a client when the client requests the URL associated that page.

The Website Building Tool includes editing tools that allow the user to insert and edit components of the web page currently displayed in the work area. These tools traditionally include tools for text insertion and formatting (such as font and style selection), margin and tab formatting, image insertion, link insertion, widget insertion, etc., layout and design tools including page insertion and management tools, and a preview tool which allows a user to view the page as it will appear if and when published. In an exemplary embodiment, the Website Building Tool also includes a link or button 304 that invokes an SEO Analyzer tool.

FIG. 3C shows a "Welcome" page 300c of an exemplary SEO Analyzer tool that may be displayed to a user when the user launches the SEO Analyzer tool. This page may explain the purpose and features of the SEO Analyzer tool and further confirms that the user wishes to proceed with website optimization. The page includes a button 305 that, if clicked, confirms the user's request for optimization.

FIG. 3D shows an analyzer configuration screen 300d that prompts the user for some preliminary information about the website, such as the company name (if applicable) 306, type of business or subject matter of website 307, country 308, and locality (e.g., city, state, etc.) 309. These entries are received by the SEO Analyzer tool and automatically included by the SEO Analyzer tool as search terms in the analysis.

Next, as shown in the exemplary screen 300e of FIG. 3E, the user is prompted (at 310) for search terms that the user thinks visitors to the user's website might enter in a search engine when looking for the user's website. To assist the user in selecting search terms that are more likely to drive traffic to the user's website, the SEO Analyzer tool also provides an embedded application 311, or widget, that displays suggestions and popular search terms related to the currently entered search terms (including the company name (if entered), country, locality, and any search terms the user enters in the search term text entry boxes). In an embodiment, the embedded application is implemented using JavaScript, Flash, HTML, DHTML, CSS, or other browser-enabled web technology. In an embodiment, the embedded application comprises browser-enabled code which makes method calls on a web Application Programming Interface (API) of a 3$^{rd}$-party application as exposed by the user's browser. In an embodiment, the 3$^{rd}$-party application is Google Insights, which provides search term suggestions and/or popular search terms related to the current search terms. In an embodiment, as the user enters additional search terms, the search term suggestions widget updates the display to reflect popular search terms relevant to the updated current set of search terms. In an embodiment, the search term suggestions and/or list of popular search terms are ranked by relevancy and/or popularity and include a meter indicator indicating relative relevance/popularity relative to the other search terms.

The user may change the current search terms and/or enter additional search terms based on the user's perceived relevancy of the search term suggestions and popularity indicated by the search terms suggestion widget. When the user is satisfied with the list of search terms to be used for the SEO analysis, the user clicks on a "Finished" button 312 to launch the analysis.

The configuration screens depicted in FIGS. 3D and 3E may be displayed to the user the first time the user invokes the SEO Analyzer tool for the particular website. Thereafter, the data captured through the configuration screens is saved and associated with the website (but can be later altered through making changes to the website itself, as discussed hereinafter). Once the configuration is first run, thereafter, when the user launches the SEO Analyzer tool (by clicking the SEO analysis button in the Website Building Tool of FIG. 3B and optionally additionally by clicking the confirmation button on the Confirmation screen of FIG. 3C), the SEO Analyzer tool automatically performs the analysis using the saved search terms.

FIG. 3F depicts an example of an exemplary Scoring screen 300f which may be displayed to the user upon completion of the analysis. In an embodiment, the Scoring screen includes an indicator 313 corresponding to an optimization rating which indicates how optimized the SEO Analyzer tool considers the website for search engine visibility based on the current search terms. While the algorithm used to determine the optimization rating of a website may vary based on different tests, measurements or scores resulting from the individual tests, categories of tests and corresponding category scores and weightings, an embodiment of an algorithm used to calculate the optimization rating may be implemented to sum the weighted values of the results of a plurality of individual tests, or alternatively to sum the weighted values of the weighted scores of a plurality of categories of individual tests.

For example, in one embodiment, the website is evaluated according to the following individual tests:

| Category | Category Weight | Test | Test Weight | Test Description |
|---|---|---|---|---|
| Site structure - General | 20% | | | |
| | | Site name - length | 10% | Test that the site name is shorter than: 30 characters Score based on character count: 1 - (length-30)/20, max 1, min 0 this should work out to 1.0 at 30 characters or less; zero at 50 or above; and linear in between. |
| | | Site name - content | 25% | Test that the site name includes a search term. Score: 0 or 1 |
| | | Meta Keywords - number | 10% | By "meta keywords", we mean the contents of the Keywords tag in the HTML head. |

| Category | Category Weight | Test | Test Weight | Test Description |
|---|---|---|---|---|
| | | | | Meta keywords should include all the defined search terms, and it may be a good idea to add variants and misspellings as well. Recommended minimum number Mn = # of search terms + min(# of pages, 10) Recommended maximum number Mx = 15 Scoring (where number of keywords defined is N) if N < Mn, score = N/Mn if Mn <= N <= Mx, score = 1.0 if Mx < N, score = max(1 − (N − Mx)/10, 0) |
| | | Canonical form defined for domain | 10% | Test that the site implements a 301 redirect to define canonical URLs for each page (ie, http://www.yoursite.com vs http://yoursite.com). Score the fraction of pages that do so. Should be automatic for customers |
| | | Have sitemap | 5% | Test if an XML sitemap is defined for the site. Score is 0 or 1. |
| | | Use hyphens in URLs | 15% | Test if the page urls use hyphens instead of underscores. Score by the fraction of URLs that do not contain underscores. |
| | | Text Links between pages | 10% | Test that each page has a link to every other page, preferably with plain text link text (rather than an image). Score is 0 or 1. 1 is customer has text footer links, 0 is customer doesn't have text footer links. |
| Site structure - Pages | 10% | | | |
| | | Page name - length | 30% | Test that each page name is shorter than: 16 characters Score based on character count: Less than 2: 0 2-3: 75% 4-16: 100% 17-20: 75% 21-25: 50% 26-30: 25% more than 30: 0% The page name must also be 4 characters or more long |
| | | Page name - content | 40% | Test that the words used in the page title also show up in the main body of the page. Score 0 or 1 based on whether the page meets this criteria Exception: If the page name is "Home", "About Us", or "Contact Us", score 1 regardless of the page body contents. |
| | | Page-Specific Descriptions | 30% | Updated: Test whether each page of the site has got a unique Description specified. Unique here means unique from other pages in the site. Blank description should be scored as not-unique. Score: 1 or 0. Weight: 1 Test whether the description is long enough but not too long Score based on character count: score 1.0 between 60 and 120 characters; linear below 60 down to zero at 0; linear above 120 down to zero at 240. Weight: 0.5 Test whether the description includes a search term Score: 1 or 0. Weight: 1 Aggregate Page Description score is the weighted average. |
| Site structure - Images | 10% | | | Scope All "Images" tests apply to: Images in Image widgets Images in Photo Gallery widgets Youtube video widgets Music player widgets Images in header placeholders do not count. The combined Images score (as shown in the left nav in View Report) is a weighted average. If the customer has fewer than three images or media objects, their #Images overall score should be reduced proportionately. Multiply the combined image score by min(n/3, 1), where n = their image/object count |
| | | Descriptive alt text for images | 60% | Test whether all images have alt text specified. For Youtube widgets, verify that there is text in the Title and Description fields. For Music Player widgets, verify that there is text in the Title and Description fields of the first song in the playlist. For each image, score 1.0 |

| Category | Category Weight | Test | Test Weight | Test Description |
|---|---|---|---|---|
| Content - General | 30% | | | if the image has at least 20 characters of alt text; linear down to zero if the alt text is missing. |
| | | Search Terms in alt text for images | 40% | Test whether enough images have search terms in their titles or descriptions Score 1.0 if 75% of images have a search term; linear down to zero if no images have search terms |
| | | Site has enough content (General) | 75% | Test that at least one page on the site has at least enough words to constitute a reasonable destination. Score by word count on the longest page: Over 500+ gets 1.0; less scales linearly down to 0. Define "word" in the most generic sense - consecutive characters separated by spaces or punctuation. |
| | | Frequency of Updates | 25% | Track running average of elapsed days between publication, updating each time the site is published (not edited). Blog updates count as a publication event Do not count RSS Feed updates Each time the site is published, update the running average In order to produce an score that declines if the site goes a long time without being published, calculate based on a modified average publication rate that assumes that the site will next be updated tomorrow. |
| | | Keyword/ Content ratio. | −25% | Keyword/Content ratio score "content - Site has enough content" down by 25% if they abuse content ratio |
| Search Terms | 30% | | | Score overall as the average of usage percentages for each search term. Also display customer individual scores for each defined search term. For each search term the customer has defined, check that each is used enough based on our defined scale. This score is totaled over all components of the site, whether user-visible or not (ie, both body content and metadata). Usage is totaled over all pages of the site, not defined per page. Using a keyword many times on one page and not at all on the others is okay. The target for weighted usage of each keyword is based on the number of pages: 1-3 pages: 10 4-6 pages: 18 7+ pages: 24 The use of a keyword is weighted differently depending on how prominently it is used. Weights are: Normal text: 1.0 Bolded/italicized text: 1.25 H1 Headings: 2.0 H2-H6 Headings: 1.5 Page Title: 5.0 Image/object alt text/tooltips: 1.0 HTML head Descriptions: 1.0 As an element of a URL: 1.0 (ie, page is named keyword.html or keyword-and-stuff.html) Other non-visible metadata (HTML head keywords, image filenames, etc): 0.25 Score overall as the average of usage percentages for each search term. If the customer has indicated a location for #Local search terms, the overall site score should be weighted 15% straight #Search Terms, 15% #Local search terms. |

Each of the individual tests is assigned a corresponding weight. The website is evaluated according to each individual test and the output of each test presents with a score. Preferably, the scores are all normalized to a 0-100 scale. Some tests may have a decimal or percentage output (for example, % images having an <alt>tag). Some tests have may have a boolean value (e.g., Site has a site map—0 if no, 1 if yes) which are then translated into 0% and 100%). Additionally, the output of some tests may have a desired target range (for example, search term density, discussed in more detail hereinafter), which is then translated to a 0%-100% scale.

The individual tests may be categorized into different categories (for example, General Site Structure, Pages in Site Structure, Images in Site Structure, General Content, and Search Terms), and a score for each category may be calculated by summing the weighted scores of each individual test belonging to the particular category. Each category may further be weighted. An overall website optimization score is generated in this embodiment by summing the weighted values of each category score. The overall website optimization score should be normalized so that it ranges between 0 and 100%.

Referring to FIG. 3F, the overall optimization score 313 is displayed to the user, along with a list 314 of the search terms used in analyzing the website to generate the score. In the illustrative embodiment, the overall optimization score 313 is displayed as a percentage between 0% reflecting not optimized for search engine visibility and 100% reflection full website optimization (per the specific algorithm used to calculate the score). The Scoring screen may also include a link 315 to view a full report (which includes detailed scoring of various tests of the website), and links to page(s) to make changes to improve the SEO rating of the website (for example, a link 316 to "Quick Fix" page and a link 317 to a content writing assistant). From the Scoring page 300*f*, the user can choose to view the report that was generated by the SEC) Analyzer tool by clicking on the View Report button 315, or choose to begin making changes to the website to try to improve the overall SEO score of the website by clicking the Quick Fixers button 3316 or the Content Optimization button 317.

FIG. 3G depicts an example of an exemplary View Report page 300*g* that is displayed to a user upon clicking the View Report button 315. In this page, category scores and/or individual test scores or other indicators 318 (such as a bargraph) are displayed to convey to the user which areas of the website need to be changed to improve the overall score. Preferably, one or more help buttons 319 are provided to allow a user to learn more about the category or test and/or how the category/test is scored. The categories and individual test identifiers 320 and 321 may be links to other pages which assist the user in making changes to improve the SEO score for the particular category or individual test. Some tests lend themselves to quick and easy fixes. For example, if the boolean test for whether the website has a site map or not turns out to be negative (which may be translated to 0%), this area of the site can be quickly improved by providing a site map. These types of tests, which can easily be improved by making simple changes to the site, may be referred to as "Quick Fixers". Tests that qualify as Quick Fixers may have a link 322 associated with them that, when clicked, generates a popup or navigates the user to a Quick Fix page specific to fixing the website (which may include metadata in the web page source) relevant to the particular test so that it passes or improves the score related to that test. Although the links 322 in the exemplary embodiment of the View Report page 300*g* as shown in FIG. 3G correspond to either Quick Fix pages (as discussed further hereinafter) or pages which assist the user in improving corresponding categories of criteria, the links leading to assistance pages and the flow for leading the user therethrough may take other forms.

FIG. 3H depicts an example Quick Fixer popup 300*h* displayed over the View Report page 300*g* of FIG. 3G which guides the user in maximizing the optimization score related to the General Site Structure category. As shown, the General Site Structure Quick Fixer popup 300*h* includes labels 323 for one or more test specific criteria and provides explanation 324 both directly on the popup and indirectly through Help buttons (not shown) that provide even more detailed explanations for the displayed labels and criteria. The popup may include user input controls, such as text entry boxes 325, buttons, etc., which allow the user to input requested data. For example, in the Quick Fixer popup of FIG. 3H, the user is requested to enter a company name (or edit the current entry), and is given exposition as to why entering the company name is important and how it is used by search engines to rank the website. Tips for deciding how much and in what form the company name should be entered for maximum SEO may also be provided. For example, in FIG. 3I1, the tool at 324*a* explains that the website name tells both users and search engines what the website is about, how it is used by search engines to rank the website, and provides tips suggesting that the website name include the company name but not be too long (e.g., suggests not more than 30 characters). A text entry input box 325*a* may be provided to allow the user to enter (or edit the current) website name. A dynamic indicator 326*a* may be presented in proximity to the Website Name label or entry box which is updated when a user enters or edits the Website Name field. Thus, the score associated with this test is dynamically updated as the user makes changes to the field so that the user can understand how the changes affect the SEO of the website generally, and also specifically as to that particular criteria (in this case, the Website Name).

Additional user input fields associated with additional different SEO criteria related to specific individual tests may also be provided in the General Site Structure Quick Fixer popup. For example, text entry boxes and explanation may be provided for optimizing the content of the Company Message, Meta Keywords, Footer Links, the URL structure, and the XML Site Map. Quick Fixer features operate similarly in terms of providing explanation and dynamically indicating how well the individual criteria scores for SEO.

FIG. 3I depicts a page 300*i* of the SEO Report which reports on the Pages section of the Site Structure. Again, there is an overall score 327 for the Pages category of the Site Structure, which is calculated by performing a number of tests, as identified in the above table, within the Pages category for each page in the website. An identifier 328 for each page (page names shown in bold) is shown along with an overall score 329 for that page. For each identified page, the individual page tests are also identified and corresponding test scores for the individual tests are shown. The scores can be viewed by the user to quickly identify which page(s) and what aspect of the page can be improved. Generally, the higher the score for a given test, the better optimized the criteria associated with the test. Low individual test scores indicate that the values for the criteria used to score the test should be changed to improve the score. For example, if the Page Name score related to the Home Page is low, this indicates that the page will be more difficult to find and/or will be poorly ranked by search engines due to the criteria used (in this case, the page name content, i.e., the actual words in the page name) to score the Page Name test.

Preferably as with all the SEO Report pages which show test scores, the Pages page of the SEO Report includes one or more links 330 to corresponding Quick Fixer dialogs which guide the user through making changes to the website that are associated with the specific criteria used to score the associated test(s) represented by the particular score(s). For example, FIG. 37 illustrates an exemplary popup window 300*j* that is displayed to the user upon the user clicking on the Quick Fixer link 330 in the Pages page 300*i* of the SEO Report of FIG. 3I. As shown, the Pages Quick Fixer popup dialog 300*j* displays suggestions 331 of how to improve the content of the website related to the Pages category of SEO, and prompts the user for initial content or to edit current content which is specific to the criteria used to score the individual tests for the Pages category. A score 329 may be displayed for the current contents of each text entry box to indicate to the user how the current contents in the associated text entry box score relative to the test. For example, in FIG. 3J the Home Page text entry box 332*a* may be edited, and the Page Description text entry box 333*a* may be edited to generate the Page Description score 335*a* as indicated. If a user edits the Home Page, the test associated with that score may be rerun and the overall score 329*a* (see FIG. 3I) is updated to reflect the impact that the updated edits have on the score for the Home Page. Likewise, when the user enters or edits the content in the text entry box associated with the Page Description 333a (see FIG. 3J), both the Page Description score 335a and the the Home Page score 329a is preferably updated to reflect the Home Page score 329a of the Home Page with the updated Page Description content. When the user is finished updating the Quick Fix content associated with the Pages category for SEO, the user can return to viewing the SEO Report by clicking on the Finished button 336, or can return without making changes by clicking on the Back button or Cancel button.

The user can then view the page of the SEO Report relating to the Images category of the website Site Structure by clicking on the link 337 (see FIG. 3I) in the SEO Report page 300i, or by clicking on the Next button 338.

FIG. 3K depicts a page 300k of the SEO Report which reports on the Images category of the Site Structure. Again, there is an overall score 340 for the Images category of the Site Structure, which is calculated by performing a number of tests, as identified in the above table, within the Images category for each page in the website. In an embodiment, the images in the website are identified 341, and where applicable, one or more criteria are identified which may improve the score of the Images category. As illustration, in the example shown in FIG. 3K, the Images page 300k of the SEO Report indicates that three of the images do not have descriptions and explains to the user that having image descriptions can improve the SEO of website. The Images page of the SEO Report includes one or more links 342 to corresponding Quick Fixer dialog(s) which guide the user through making changes to the website that are associated with the specific criteria used to score the associated test(s) represented by the particular score(s). For example, FIG. 3L illustrates an exemplary popup window 300l that is displayed to the user upon the user clicking on the Quick Fixer link 342 in the Images page 300k of the SEO Report of FIG. 3K. As shown, the Images Quick Fixer popup dialog 300l displays suggestions 343 of how to improve the content of the website related to the Pages category of SEO, and prompts the user for initial content or to edit current content which is specific to the criteria used to score the individual tests for the Images category. A score 344a, 344b, 344c may be displayed for the current contents of each text entry box 345a, 345b, 345c to indicate to the user how the current contents in the associated text entry box 345a, 345b, 345c score relative to the test. For example, in FIG. 3L, a text entry box 345a, 345b, 345c may be provided next to the identifier of each image (and a thumbnail image may be displayed for reference) which prompts the user for a description of the image which is used as the criteria for scoring the Images page (and is also used by search engines in determining the rankings of the pages of the website). In an embodiment, if a user enters or edits text in an image description text entry box 345a, 345b, 345c, the test associated with that image may be rerun and the associated score 344a, 344b, 344c is updated to reflect the impact that the updated edits have on the score for that image. When the user is finished updating the Quick Fix content associated with the Images category for SEO, the user can return to viewing the SEQ Report by clicking on a control, such as a Next button 346 or a Finished button, or can return without making changes by clicking on a Back button, a Cancel button, or a Close button.

The user can then view the page of the SEO Report relating to the General category of the website Content by clicking on the corresponding link in the SEQ Report page, or by clicking on the Next button. FIG. 3M depicts an exemplary page 300m of an SEO Report pertaining to the Content of the website in general. Identifiers "Length" 347 and "Freshness" 348 identify the general tests of the overall content of the website. The score 349, 350 is associated with each test is also displayed to give the user an idea of how the content fares in relation to these tests and whether or not the content needs to be changed or updated to improve the SEO of the website.

The user can then view the page of the SEO Report relating to the Search Terms category of the website Content by clicking on the corresponding link 352 in the SEO Report page 300k, or by clicking on the Next button 351. FIG. 3N depicts an exemplary page 300n of an SEO Report pertaining to the Search Terms in the Content of the website. In an embodiment, each Search Term is identified 353a, 353b, 353c, etc. along with a corresponding strength test score 354a, 354b, 354c, etc., which indicates how the website performs in search engine rankings against the search term. In an embodiment, one or more pages of the website are identified as performing best 355 against the corresponding search term. Alternatively or in addition, the page could also include identifiers of the poorest performing page(s) or a score for each page. The Search Terms page of the SEO Report may also include an indicator indicating the ratio of Content to Search Terms 356 (which should not be too high), or ratio of Search Terms to Content (which should not be too low). This indicates whether more search terms should be added to the text of the website content in order to improve SEO. When the user is finished optimizing the search terms, the user clicks on the Done button 357.

The user may be returned to the page shown in FIG. 3F, or alternatively, the flow may take the path of one or more additional pages. FIG. 3O depicts an exemplary page 300o displayed to the user upon clicking the Done button 357 in the page of FIG. 3N. In order to improve the Content of the website, the user is provided with an Optimize Content link 358 which, when activated by a user, launches one or more applications that provides the user with education and assists the user in writing effective content for one or more pages of the website, Preferably, a link 358 to the Optimize Content page is accessible from all web pages, windows, dialogs, and pop-ups presented by the SEO engine, or at least those pages, windows, dialogs, and/or pop-ups specific to the Content category of the website.

The FIG. 3P depicts a popup menu 300p that is displayed to the user upon activation of the Optimize Content link 358. The popup menu 300p provides links to a Search Assistant 359 which assists the user in selecting highly used search terms to use within the content of the website, a Writing Wizard 360 which assists the user in writing content for pages and sections of the website, and a Writing Tips tool 361 which educates the user in how to write content for high visibility to search engines.

FIG. 3Q is an example of a popup 300q that may be presented to a user upon selection of the Writing Tips link 361 in the popup menu of FIG. 3P. As illustrated, a set of content writing suggestions, explanations, and tips are presented to the user to assist the user in writing content that will improve the visibility of the website to a search engine. For example, one tip expounded by the popup indicates that incorporation of the search terms within the body of the text where it makes sense. Activation of the Writing Tips link is shown in the exemplary embodiment as generating a popup, but it could just as well be implemented as a separate panel display in the Website Building Tool, a separate web page, one or more hover-over popups placed in key places in the SEO report, inline in the SEO report, etc. Tips can also be placed redundantly throughout the SEO report and website flow, both as popups, standalone web pages, hover-over popups, etc.

The importance of having good search terms for visibility to search engines cannot be underestimated. One or more links to the Search Term Assistant is provided within the SEO engine flow to allow the user to take advantage of search statistics to select search terms that are popular in the industry or topic(s) of relevance of the particular website being analyzed. For example, a link 359 to the Search Term Assistant is placed on the popup menu 300*p* of FIG. 3P and the popup 300*r* of FIG. 3R. Activation of the Search Term Assistant link 359 may cause a popup to be displayed or a web page 300*e* such as that of FIG. 3E. The Search Term Assistant presents the current search terms, preferably in an editable text entry box. Preferably, the Search Term Assistant presents a score next to each search term, and also provides suggestions for popular (most search for in a known range of time and known geography) search terms that may be related to the current search terms or other information known or derived by the SEO engine from the user's website.

Returning to FIG. 3P, the user can activate a Writing Wizard which assists the user in writing content. When the Writing Wizard link 360 is activated, the user may be presented with a web page 300*r* such as that shown in FIG. 3R. As illustrated, the Writing Wizard assists the user in writing content by prompting the user for information specific to the industry of the business promoted by the website, or purpose 363 of the website, and then locates pre-written content in the content database and pre-populates the selection section of the website with the pre-written content. The pre-written content is content, for example text, that may be general to a particular industry or purpose. In an embodiment, the user is prompted for the desired section of the website (in selection menu 362) and the particular purpose (in selection menus 363). For example, a user may select a section 362 and purpose 363 of the website from a dropdown menu. The user may further be prompted for an industry which the website belongs to. The user may further be prompted for a sub-industry 364 within the general industry. Additional prompts may be implemented to elicit as much information from the user as possible about the type of text that the user desires to see and which is appropriate for the selected section of the website. Alternatively, the information elicited from the user, such as the industry, sub-industry, etc., may be previously stored and associated with the website when the user first configures the website or edits the website. In addition, this information may be obtained automatically by the SEO engine by parsing the current content of the website. Based on the inputs received from the prompts (e.g., website section, section purpose, industry, sub-industry, etc.), the Writing Wizard searches the copy database or library 125 (see FIG. 1) for pre-written content associated with the input set of parameters and places it in an editable text box 365.

In an embodiment, the pre-written text 367 comprises text copy that is pre-written by a designer or copy artist that is likely to be relevant to the particular website section, section purpose, industry and sub-industry associated with that pre-written text. In order to improve the search engine visibility, the pre-written text 367 includes "fill-in-the-blank" words or phrases 366 that indicates to the user to enter various information specific to their business/trade or other purpose of the website or website section. For example, in FIG. 3R, the "fill-in-the-blank" indications 366 are the words that are enclosed by the tags <and> and are further highlighted to catch the user's attention. In addition, the instructions indicate to the user to fill in specific information as requested in the highlighted areas. Preferably, the entire pre-written text 367 is editable by the user so that the user can reword, add, delete, and otherwise modify the text. A control, such as a Finished 368 button, is provided to allow the user to indicate that the user is satisfied with the current text and to indicate to the Writing Wizard that the current text should be inserted in the website at the selected website section.

Throughout the flow of the SEO Analyzer, multiple links are accessible to the user on multiple pages to access the various tools provided by the analyzer. For example, the user can re-run the SEO Report, skip to Quick Fixers, jump to the Writing Wizard, and update the Search Terms from multiple pages in the SEO Analyzer flow. This allows maximum flexibility to the user yet also provides a guided tour in which the output is a maximally optimized website for search engine visibility if the user simply follows each Next link in the tour and provides the prompted information at each page or popup.

FIG. 4 is a flowchart of an exemplary method performed by the SEO engine for guiding a user through a set of SEO optimization functions to improve the SEO of a website. As illustrated, a website is accessible by the SEO engine (step 401). The user may provide the URL or internal address. Alternatively, access to the website pages is automatic when the user logs in to the website administration tool or Website Building Tool. The SEO engine receives one or more search terms (step 402). The SEO engine may trigger a query to the user for the search terms, or alternatively the search terms may be retrieved from a database which stores previously stored search terms associated with the website. In either case, the SEO engine obtains search terms. The SEO engine may also determine and display suggested search terms (step 403) that may be related to the input search terms and which have been determined to be search terms that Internet users often enter when searching. The SEO engine may also display an indication of how a particular search term ranks relative to the other search terms (step 404) (which may include the user's search terms and the suggested search terms, or the rankings may be relative only among the suggested search terms).

The user may further be prompted for one or more terms that describe the business or content of the website (step 405). The general topic may be a general industry or a general subject matter. If the purpose of the website is to promote a business, the general topic is preferably a general industry. In an embodiment, the user may select the general topic from a list of choices presented in a drop-down list. If the purpose of the website is to promote an organization such as a non-profit organization or a club or an individual's personal website, the general topic is preferably a general subject matter.

The user may additionally be prompted for a name of the company or topic being promoted in the website (step 406). The terms and phrases input by the user in steps 405 and 406 are added to a list of search terms on which the subsequent website analysis will be based (step 408).

The user may further be prompted for a location such as where the user's business is located (step 407). The location may be added to the list of search terms on which the website analysis will be based (step 408). The location will also be used by the SEO engine to present search term suggestions that people located near the business are currently searching for.

After collecting the list of search terms, the SEO engine performs an analysis of the website based on the list of search terms and the content (including metadata) of the website (step 409). To perform the analysis, the SEO engine tests various aspects of the website according to criteria associated with tests for the individual aspects of the website (step 410). Preferably, individual scores for each tested aspect are calculated. An overall score may be generated based on the scores of the individual tests (step 411). The analysis includes the generation of a report (step 412) which may be displayed (step 413) to the user, preferably within a website building tool where the user can make changes directly to the website while viewing, or switching in and out of, the report.

The report presents a plurality of indicators associated with the various tested aspects of the website (step 414). Each indicator indicates how the website scores in terms of the tested aspect of the website. One or more quick fix links or other website control is provided (step 415) which, when activated by the user (step 416), provides one or more user input text entry boxes or other user input controls (step 417) which prompt the user for particular input that will be applied to a corresponding aspect of the content of the website. In addition to the user input prompts for specific user input, the user is provided with assistance (step 418) in terms of explanation or tips, that are designed to educate the user to maximize the optimization of the website for the corresponding particular aspect associated with the user input prompts for maximizing visibility of the website to search engines. Upon receiving user input associated with a corresponding aspect of the content of the website (step 419), the SEO engine causes the updating of content of the website corresponding to the particular aspect of the website for which the user input was solicited (step 420). This can be in the form of automatic insertion and/or updating of metadata of the website, or updating or editing content of the website that will be visible to a visitor to the website when published. In an embodiment, the SEO engine is integrated into the Website Building Tool and can automatically edit and make changes to the content such that the changes to the content correlate to the user input corresponding to a particular aspect of the website.

The SEO engine also provides a content writing tool (step 421) which provides explanation for writing content optimized for search engine visibility and provides one or more controls for allowing the user to select from a plurality of pre-written text copy that is relevant to the subject matter of the website (step 422). In an embodiment, the content writing tool elicits information about the type of text that the user desires to populate at least one section of the website (step 423), selects text copy from a text copy database appropriate to the elicited information (step 424), and populates the at least one section of the website with the selected text copy (step 425). The selected text copy may include one or more editable sections that allow the user to customize the inserted text copy specific to the user's website, For example, in an embodiment, the text copy may include one or more customizable terms or phrases that the user should provide to customize the copy to the subject matter and purpose of the website. The user may be prompted for these customizable terms or phrases (step 426).

The SEO engine also provides one or more controls which assist the user in selecting one or more search terms for SEO (step 427). These search terms are used in writing the content for the website and are what the analysis is based on. In an embodiment, a Search Term Assistant tool is provided within the SEO engine flow to allow the user to take advantage of search statistics to select search terms that are popular in the industry or associated with topic(s) of relevance of the particular website being analyzed. In an embodiment, suggestions for popular search terms that may be related to the current search terms or other information known or derived by the SEO engine from the user's website are displayed (step 428), along with a score or other ranking for each search term (step 429).

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method utilizing at least one computer processor for assisting a user in optimizing a website for search engine visibility, the method comprising:
   providing the user access to the website;
   receiving one or more search terms from the user and adding the received one or more search terms to a list of search terms on which an analysis of the website will be based;
   submitting at least one of the one or more received search terms to a keyword research tool which performs a search for related search terms that are frequently searched for and corresponding search statistics;
   receiving one or more related search term results and the corresponding search statistics from the keyword research tool;
   determining and displaying one or more suggested search terms based on the received one or more related search term results;
   allowing the user to select at least one of the one or more suggested search terms and adding the at least one selected search term to the list of search terms;
   performing the analysis of the website based on the list of search terms and content of the website, the analysis comprising testing a plurality of different aspects of the website according to corresponding respective testing criteria;
   providing access to a report, the report displayable to the user and presenting at least one indicator, and an overall score, wherein
      each indicator associated with one or more of the tested aspects of the website and indicating a corresponding optimization score representing how optimized the associated one or more tested aspects of the website is in terms of visibility to search engines,
      the overall score is generated based on aggregating all respective optimization scores of the one or more tested aspects, the overall score representing a rating of how well optimized the website is for the search engine visibility;
      the report providing at least one control which, when activated by the user, allows the user to enter input associated with at least one of the one or more tested aspects of the website,
      the user's entry of the input causes update to the content of the website and
      the report includes one or more explanations to assist the user in entering the user input that will result in an improvement to the optimization score of the associated one or more tested aspects of the website.

2. The method of claim 1, further comprising:
   receiving one or more terms that describe the business or the content of the website; and
   adding the received one or more terms to the list of search terms.

3. The method of claim 1, further comprising:
   displaying a ranking of the one or more suggested search terms.

4. The method of claim 1, further comprising:
   receiving a location; and
   determining at least some of the one or more suggested search terms based on what people located near the received location are currently search for.

5. The method of claim 1, further comprising:
providing the access to the website in a website building tool.

6. The method of claim 1, wherein the step of performing the analysis comprises:
calculating a corresponding optimization score for each tested aspect.

7. The method of claim 1, wherein the report is displayed within a website building tool to allow changes indicated by the report to be made directly to the website.

8. The method of claim 1, further comprising:
providing a content writing tool which educates the user on writing content for optimization of the search engine visibility and which provides one or more controls for allowing the user to select an area of the website and to select from a plurality of pre-written text copies, the selected pre-written text copy being automatically inserted into the selected area of the website.

9. The method of claim 8, wherein the one or more controls for allowing the user to select from the plurality of pre-written text copies comprise a dropdown list containing different subject matters, wherein at least some of the listed subject matters map to different pre-written text copy.

10. One or more non-transitory computer readable storage media together tangibly embodying program instructions which, when executed by a computer, implement a method for assisting a user in optimizing a website for search engine visibility, the method comprising:
providing the user access to the website;
receiving one or more search terms from the user and adding the received one or more search terms to a list of search terms on which an analysis of the website will be based;
submitting at least one of the one or more received search terms to a keyword research tool which performs a search for related search terms that are frequently searched for and corresponding search statistics;
receiving one or more related search term results and the corresponding search statistics from the keyword research tool;
determining and displaying one or more suggested search terms based on the received one or more related search term results;
allowing the user to select at least one of the one or more suggested search terms and adding the at least one selected search term to the list of search terms;
performing the analysis of the website based on the list of search terms and content of the website, the analysis comprising testing a plurality of different aspects of the website according to corresponding respective testing criteria;
providing access to a report, the report displayable to the user and presenting at least one indicator, and an overall score, wherein
each indicator associated with one or more of the tested aspects of the website and indicating a corresponding optimization score representing how optimized the associated one or more tested aspects of the website is in terms of visibility to search engines,
the overall score is generated based on aggregating all respective optimization scores of the one or more tested aspects, the overall score representing a rating of how well optimized the website is for the search engine visibility;
the report providing at least one control which, when activated by the user, allows the user to enter input associated with at least one of the one or more tested aspects of the website,
the user's entry of the input causes update to the content of the website and
the report includes one or more explanations to assist the user in entering the user input that will result in an improvement to the optimization score of the associated one or more tested aspects of the website.

11. The non-transitory computer readable storage media of claim 10, the method further comprising:
receiving one or more terms that describe the business or the content of the website; and
adding the received one or more terms to the list of search terms.

12. The non-transitory computer readable storage media of claim 10, the method further comprising:
displaying a ranking of the one or more suggested search terms.

13. The non-transitory computer readable storage media of claim 10, the method further comprising:
receiving a location; and
determining at least some of the one or more suggested search terms based on what people located near the received location are currently search for.

14. The non-transitory computer readable storage media of claim 10, the method further comprising:
providing the access to the website in a website building tool.

15. The non-transitory computer readable storage media of claim 10, wherein the step of performing the analysis comprises:
calculating a corresponding optimization score for each tested aspect.

16. The non-transitory computer readable storage media of claim 10, wherein the report is displayed within a website building tool to allow changes indicated by the report to be made directly to the website.

17. The non-transitory computer readable storage media of claim 10, the method further comprising:
provmiding a content writing tool which educates the user on writing content for optimization of the search engine visibility and which provides one or more controls for allowing the user to select an area of the website and to select from a plurality of prewritten text copies, the selected pre-written text copy being automatically inserted into the selected area of the website.

18. The non-transitory computer readable storage media of claim 17, wherein the one or more controls for allowing the user to select from the plurality of pre-written text copies comprise a drop-down list of different subject matters, wherein at least some of the listed subject matters map to different pre-written text copy.

19. A website optimization apparatus for optimizing a website for search engine visibility, the tool comprising:
one or more computer processors;
non-transitory computer readable storage media storing program instructions which, when executed by the one or more processors, implement a method comprising:
providing the user access to the website;
receiving one or more search terms from the user and adding the received one or more search terms to a list of search terms on which an analysis of the website will be based:
submitting at least one of the one or more received search terms to a keyword research tool which performs a search for related search terms that are frequently searched for and corresponding search statistics;

receiving one or more related search term results and the corresponding search statistics from the keyword research tool;

determining and displaying one or more suggested search terms based on the received one or more related search term results;

allowing the user to select at least one of the one or more suggested search terms and adding the at least one selected search term to the list of search terms;

performing the analysis of the website based on the list of search terms and content of the website, the analysis comprising testing a plurality of different aspects of the website according to corresponding respective testing criteria;

providing access to a report, the report displayable to the user and presenting at least one indicator, and an overall score, wherein each indicator associated with one or more of the tested aspects of the website and indicating a corresponding optimization score representing how optimized the associated one or more tested aspects of the website is in terms of visibility to search engines, the overall score is generated based on aggregating all respective optimization scores of the one or more tested aspects, the overall score representing a rating of how well optimized the website is for the search engine visibility;

the report providing at least one control which, when activated by the user, allows the user to enter input associated with at least one of the one or more tested aspects of the website, the user's entry of the input causes update to the content of the website, and the report includes one or more explanations to assist the user in entering the user input that will result in an improvement to the optimization score of the associated one or more tested aspects of the website.

20. The apparatus of claim 19, wherein the non-transitory computer readable storage media storing a plurality of pre-written text copies, and a content writing tool which educates the user on writing content for optimization of the search engine visibility and which provides one or more controls for allowing the user to select an area of the website and to select from the plurality of pre-written text copies, the selected pre-written text copy being automatically inserted into the selected area of the website.

* * * * *